United States Patent [19]

Clarke et al.

[11] Patent Number: 4,916,692
[45] Date of Patent: Apr. 10, 1990

[54] TDM BUS CONTROLLER

[75] Inventors: George A. Clarke; Juan E. Farias, both of Sunrise; Raul F. Fernandez, Miami; Dale R. Jenkins, Sunrise; Jon S. Miller, Pembroke Pines; Edward J. Sackman, III, Sunrise; Donald L. Wray, Lauderdale; Leroy D. Young, Cooper City, all of Fla.

[73] Assignee: Racal Data Communications Inc., Sunrise, Fla.

[21] Appl. No.: 167,816

[22] Filed: Mar. 14, 1988

[51] Int. Cl.$^4$ ............................................. H04J 3/24
[52] U.S. Cl. ....................................... 370/85.1; 370/92
[58] Field of Search ................. 370/61, 66, 67, 84, 370/85, 86, 89, 90, 92, 95, 105, 56, 68, 112, 85.1, 94.1, 94.2, 105.1, 105.2

[56] References Cited

U.S. PATENT DOCUMENTS

| | | |
|---|---|---|
| 3,856,993 | 12/1974 | Closs et al. |
| 4,227,178 | 10/1980 | Gergaud et al. |
| 4,229,792 | 10/1980 | Jensen et al. |
| 4,402,073 | 8/1983 | Hammond |
| 4,439,856 | 3/1984 | Ulug |
| 4,441,162 | 4/1984 | Lillie |
| 4,511,958 | 4/1985 | Funk |
| 4,511,969 | 4/1985 | Koenig et al. |
| 4,536,838 | 8/1985 | Ringel et al. |
| 4,543,501 | 9/1985 | Chevalet et al. |
| 4,568,930 | 2/1986 | Livingston et al. |
| 4,590,467 | 5/1986 | Lare |
| 4,694,453 | 9/1987 | Kobayashi et al. ................. 370/85.1 |
| 4,700,341 | 10/1987 | Huang |
| 4,733,390 | 3/1988 | Shirakawa et al. .................... 370/85 |
| 4,759,012 | 7/1988 | Suzuki ..................................... 370/68 |
| 4,763,321 | 8/1988 | Calvignac et al. ...................... 370/85 |
| 4,792,944 | 12/1988 | Takahashi et al. ...................... 370/84 |
| 4,799,218 | 1/1989 | Sakagami et al. .................. 370/85.1 |

Primary Examiner—Douglas W. Olms
Assistant Examiner—Melvin Marcelo
Attorney, Agent, or Firm—Jerry A. Miller

[57] ABSTRACT

An apparatus for controlling access to a time division multiplexed (TDM) bus includes a frame address register having a plurality of storage registers for storing a plurality of frame addresses designated for use in communicating over said TDM bus. A frame address latch stores a current frame address. A frame comparator, coupled to the frame address register and the frame address latch, compares the designated frame addresses with the current frame address and produces a first signal indicative of the storage register containing a frame address matching the current frame address. A time slot register has a plurality of storage registers for storing a time slot number designated for use in communicating over said TDM bus. A time slot generator generates a current time slot number. A time slot comparator, coupled to the time slot register and the time slot generator compares the designated time slot number with the current time slot number and produces a second signal indicative of the storage register containing a slot number matching the current time slot number. A token generator, coupled to the frame comparator and the time slot comparator receives the first and second signals and generates a token work unique to the first and second signals. A data transfer circuit transfers a data word to or from the TDM bus responsive to the token word.

39 Claims, 14 Drawing Sheets

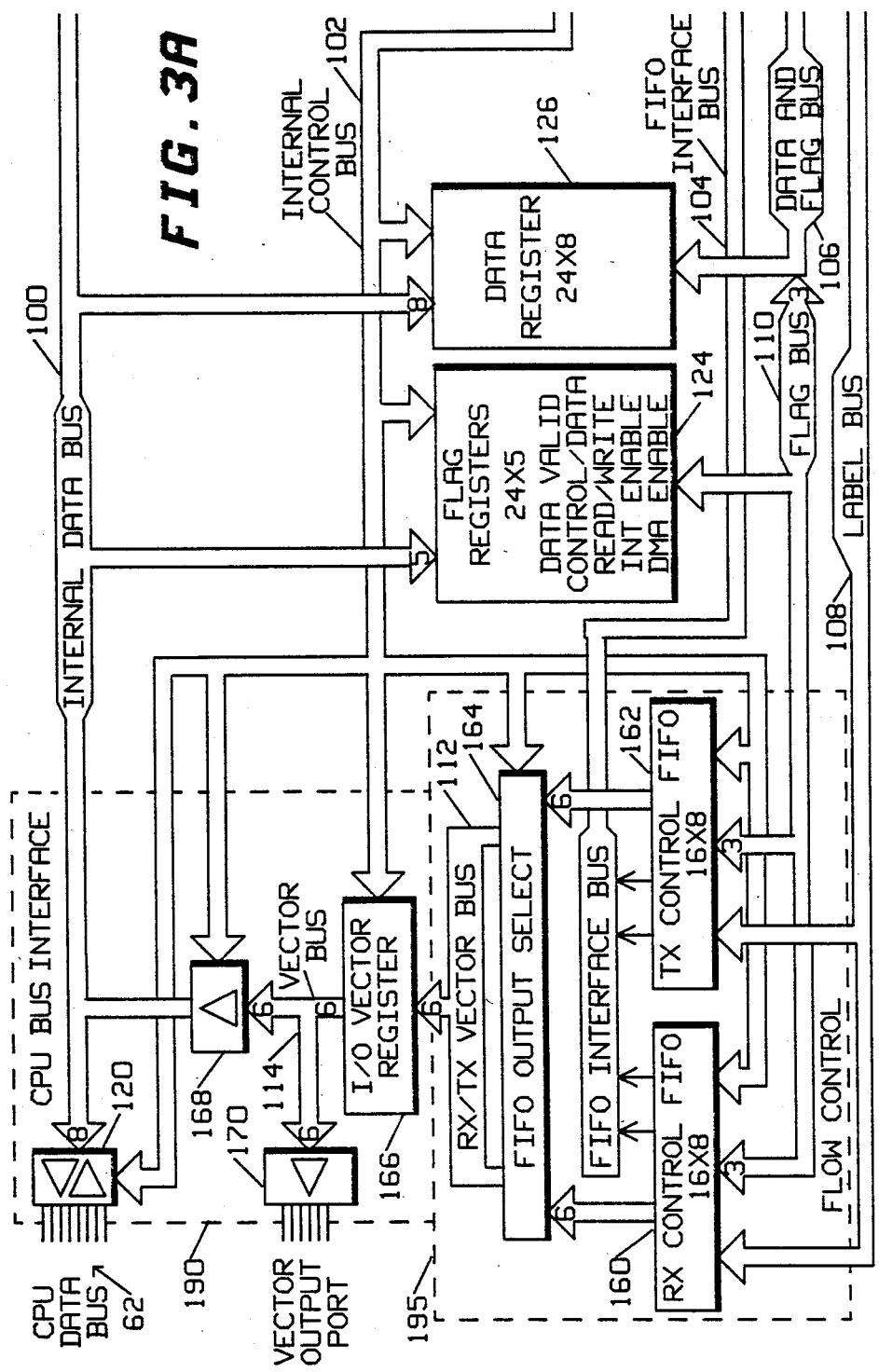

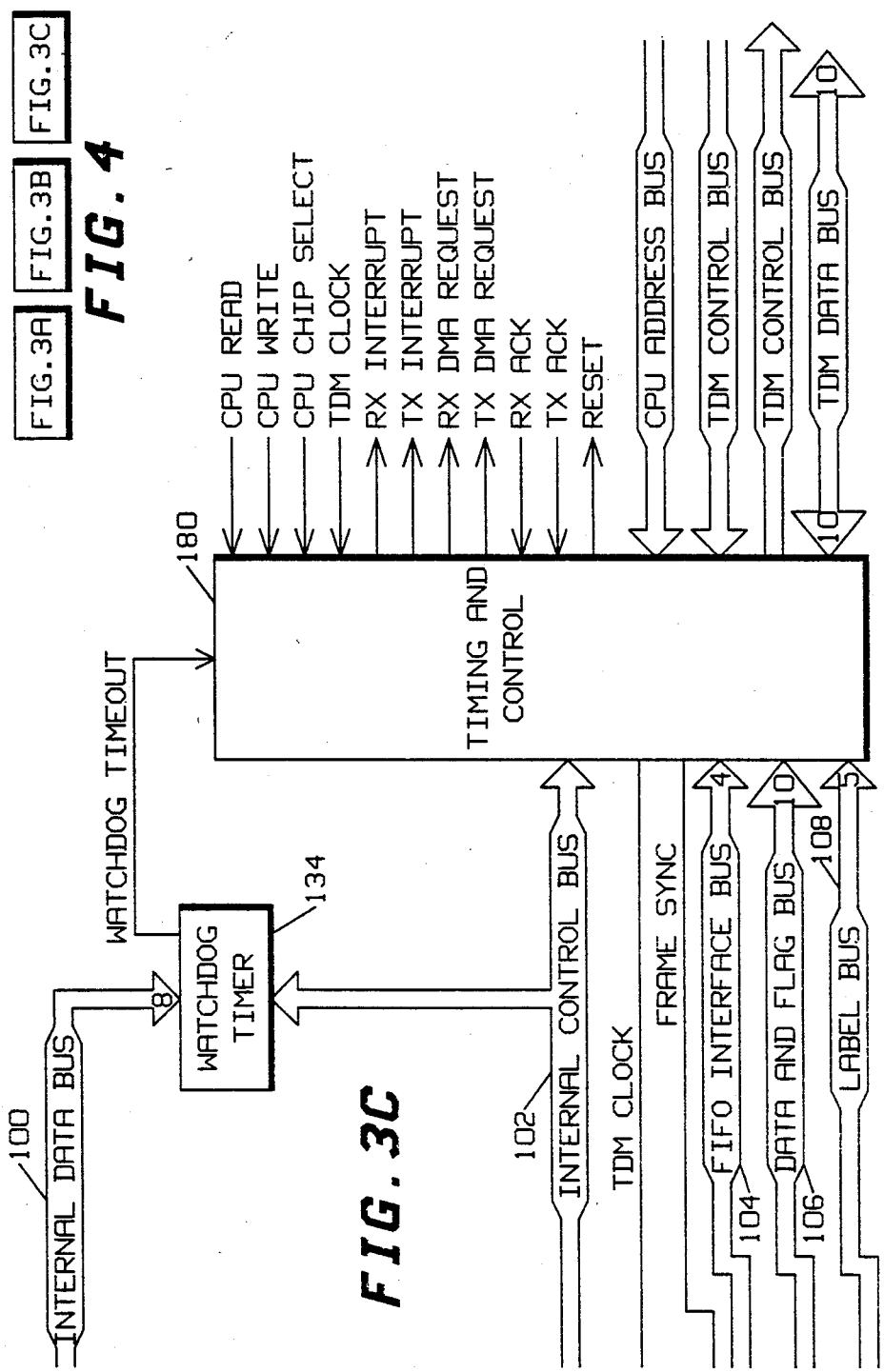

TDM BUS CONTROLLER

BACKGROUND

1. Field of the Invention

This invention relates generally to the field of bus communication using time division multiplexing (TDM) and more particularly to a bus controller for a high speed time division multiplexed bus.

2. Background of the Invention

The present invention is intended to optimize versatility and speed in communications over a high speed time division multiplexed bus. This bus is used to transfer information from one device such as a modem or the like to another such as a digital service unit. In order to make such data transfers, the TDM bus is partitioned into frames of time slots which each carry a data word. The TDM bus controller of the present invention has the job of controlling access to and from the TDM bus.

Typically, the information is being transmitted between the TDM bus and a processor of some type. The processor handles communication with other devices such a modem, DTE (Data Terminal Equipment), etc. The TDM bus controller is responsible for making sure that the data destined for a particular address actually gets there when receiving information from the TDM bus. When transmitting information over the TDM bus, the TDM bus controller's job is to assure that the information is placed in the correct frame and time slot so that a proper communication link is established. When receiving information from the bus, the TDM bus controller's job is to assure that the correct information is being removed from the bus.

In general, the TDM bus is a high speed bus which is capable of operation at speeds many times faster than the processor with which it is communicating. Thus, the TDM bus controller has to be able to rapidly effect the proper transfer in an efficient manner. It is also desirable to assure that bursts of data are received in the proper order at the destination and to assure that all data channels are ultimately serviced. The present invention serves this function using an unique bus protocol and an unique internal token used to point to the storage location for a particular data word.

SUMMARY OF THE INVENTION

It is an object of the present invention to provide an improved bus controller for controlling access to a time division multiplexed communication bus.

It is another object of the present invention to provide a method of controlling access to a time division multiplexed bus.

It is another object of the present invention to provide connectivity between any two devices on a TDM bus using any time slot.

It is another object of the present invention to assure that data passing over the TDM bus is maintained in proper order by the TDM bus controller and that lower priority data channels are ultimately serviced.

It is a further object of the present invention to provide a TDM bus controller which utilizes an internal token word (register label) to identify the frame and slot of a TDM communication bus.

These and other objects of the invention will become apparent to those skilled in the art upon consideration of the following description of the invention.

In one embodiment of the present invention, an apparatus for controlling access to a time division multiplexed (TDM) bus includes a frame address register having a plurality of storage registers for storing a plurality of frame addresses designated for use in communicating over said TDM bus. A frame address latch stores a current frame address. A frame comparator, coupled to the frame address register and the frame address latch, compares the designated frame addresses with the current frame address and produces a first signal indicative of the storage register containing a frame address matching the current frame address. A time slot register has a plurality of storage registers for storing a time slot number designated for use in communicating over said TDM bus. A time slot generator generates a current time slot number. A time slot comparator, coupled to the time slot register and the time slot generator compares the designated time slot number with the current time slot number and produces a second signal indicative of the storage register containing a slot number matching the current time slot number. A token generator, coupled to the frame comparator and the time slot comparator receives the first and second signals and generates a token word unique to the first and second signals. A data transfer circuit transfers a data word to or from the TDM bus responsive to the token word.

According to the present invention, a random access frame address is latched from the TDM bus and combined with a time slot counter value to create an unique time slot label. A plurality of time slot label registers are simultaneously compared to the current time slot. A matching time slot lable enables an associated data register to perform a transfer on the TDM bus.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 4 is a diagram showing how to integrate FIGS. 3a, 3b and 3c.

DETAILED DESCRIPTION OF THE INVENTION

Figure 1:
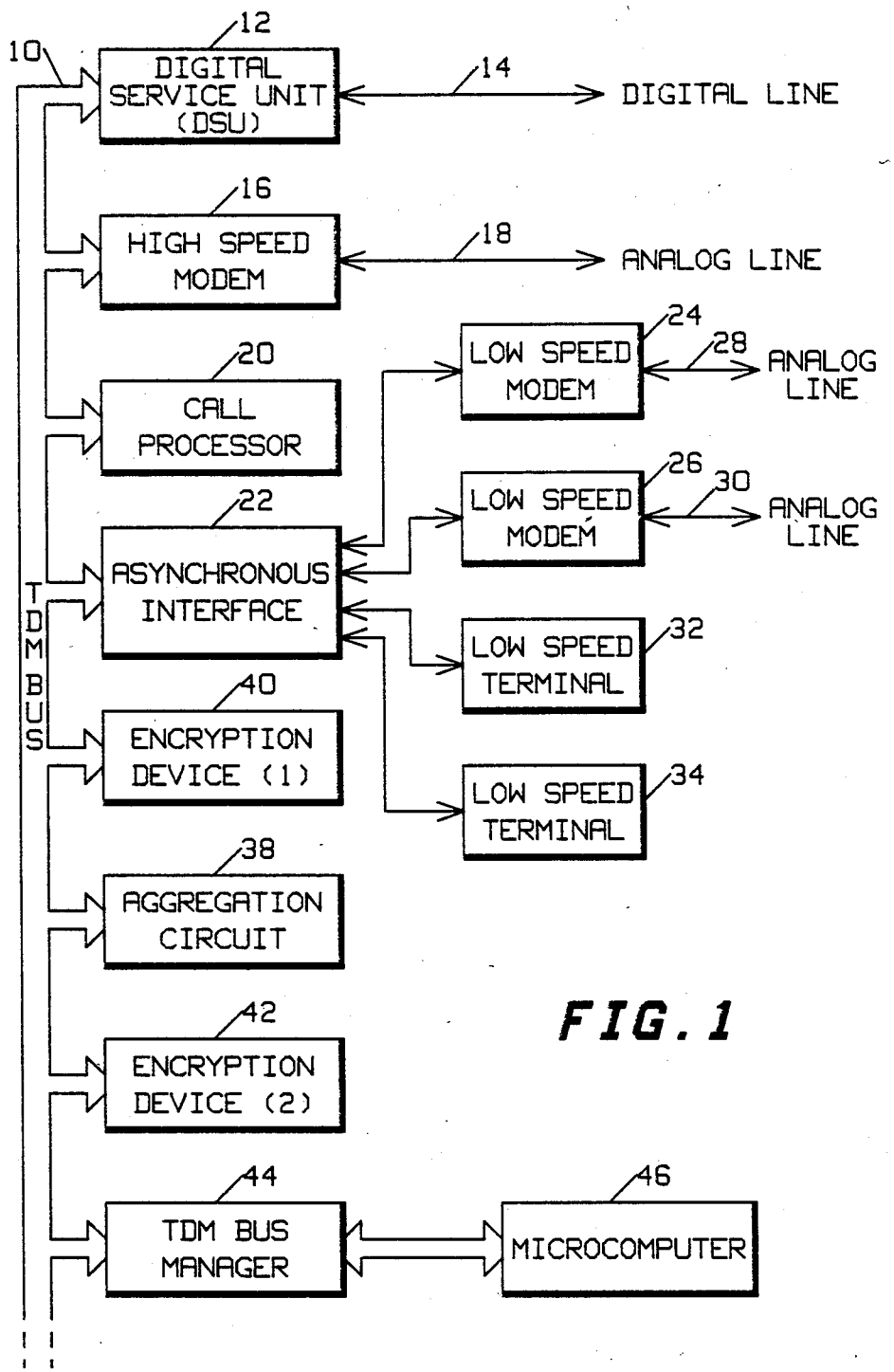
FIG. 1 shows a system utilizing the high speed TDM bus controller of the present invention.

Turning now to FIG. 1, an example system utilizing a high speed TDM bus 10 for communication between various modules is shown. This system is not intended to be limiting, but rather it is disclosed as an example embodiment which might utilize a high speed TDM bus as an interconnecting and switching mechanism for the various modules. The figure shows a high speed TDM bus 10 which is coupled to a digital service unit (DSU) 12. The digital service unit is coupled to a digital line 14 such as those which provide DDS (Dataphone Digital Service TM, American Telephone and Telegraph Company) digital communications. Also coupled to the TDM bus 10 is a high speed modem 16 which is connected to an analog line 18 as is commonly known in the art. The TDM bus 10 further is coupled to a call processor module 20 as well as an asynchronous interface module 22. The call processor module is used to set up connections and to handle routing of switched connection circuits. The asynchronous interface module 22 is used to interface to a number of lower speed asynchronous devices such as low speed modems 24 and 26 which are coupled to analog lines 28 and 30 respectively. The asynchronous interface module 22 may also be coupled to other low speed devices such as low speed terminals 32 and 34 as well as other devices. In the preferred embodiment each asynchronous interface module 22 will communicate with 6 to 8 such lower speed devices.

Operating in conjunction with the asynchronous interface 22 is an aggregation (more properly referred to as an agregation/deagregation) circuit 38 which serves to statistically interleave information from low speed devices 24, 26, 32 and 34 received over the TDM bus from asynchronous interface 22. This interleaved information may then be placed back out on the TDM bus 10 for use by other devices such as, for example, high speed modem 16. The asynchronous interface 22 may be used primarily to provide an interface and buffer for the low speed devices.

Various other devices such as encryption (encryption/decryption) device 40 and spare encryption device 42 may also be interfaced to the TDM bus. Typical circuits such as that shown in FIG. 1 may also include numerous other devices such as diagnostics controllers and other types of communications devices in a typical network.

The TDM bus allows the various devices to share a common rack, power supply, backplane, etc. as well as providing a connection mechanism which may be largely wireless in the sense that various bulky cables and connectors and the like are largely unnecessary to interconnect the various modules.

The network of FIG. 1 also includes a TDM bus manager 44 coupled to the TDM bus. Coupled to, or forming a part, the TDM bus manager 44 is a microcomputer 46 which may be similar to an IBM ® personal computer or the like having a central processor, keyboard, display, RAM, ROM and mass storage such as hard and/or floppy disk drives. The microcomputer 46 is used to store a resource data base describing the system which includes such information as device type, slot number for each device type, connection information and the like which is needed to fully describe the system and its interconnection. The TDM bus manager 44 includes a bandwidth allocator and a timing generator. The bandwidth allocator computes an appropriate frame and time slot configuration to assure that all of the devices in the system are allocated appropriate bandwidth. The timing generator generates timing signals such as the TDM clock and frame sync signal used by the TDM bus. In some embodiments, the bandwidth allocator forms part of the software driving the microcomputer 46. In some embodiments, the timing generator may form a part of the TDM bus controller, in which case only one such timing generator is active per bus or card cage. This one TDM bus controller may be designated the Master in such cases with the others designated Slave.

At the time of powering up the system, or resetting the system, the microcomputer 46 references the resource database to determine the configuration of the system. The bus manager 44's bandwidth allocator then computes or looks up an appropriate frame and time slot arrangement for communication on the TDM bus. Microcomputer 46 then informs TDM bus manager 44 of the configuration. The bus manager 44 informs each device with a TDM bus controller of its specific frame and time slot information via control information passed either over the TDM bus or a separate control bus. The processor 52 then writes the appropriate frame and time slot information to the appropriate registers of the TDM bus controller of each of the devices coupled to the TDM bus to assure that all modules coupled to the TDM bus are adequately serviced. The TDM bus manager 44 thus configures the system by writing these frame and time slots to registers within the TDM bus controllers situated on each of the devices coupled to the TDM bus. These frame and time slot assignments are then utilized by the TDM controllers as will be described in conjunction with FIG. 3. In one embodiment, the actual program code used by the various devices coupled to the TDM bus may be stored on mass storage in the microcomputer 46 and downloaded to the individual devices at the time of initialization of the system so that program updates and modifications may be facilitated by changes to the code in mass storage. In other embodiments, the program code is permanently stored in ROM on the devices coupled to the bus.

As previously stated, the network shown in FIG. 1 is only submitted as illustrative of the types of devices which may utilize the common TDM bus 10 using the TDM bus controller of the present invention. In FIG. 1 each of the devices tied to the TDM bus will utilize a TDM bus controller to manage putting data onto or taking data from the TDM bus. The TDM bus controller also manages information transfer to and from processors located on each of the connected devices.

In the system shown in FIG. 1, the TDM bus is utilized somewhat like a switching mechanism to facilitate transfer of data between the various modules tied to the TDM bus 10. For example, digital service unit (DSU) 12 may receive very high speed data over digital line 14 which contains encrypted data destined for output over high speed modem 16. According to the programming of the system, encryption device 40 may receive the encrypted data from digital service unit 12 over the TDM bus. Encryption device 40 then decrypts the encrypted data and places the data back on the TDM bus 10 where it is received by high speed modem 16 and transmitted back out over analog line 18. In the event of failure of encryption device 40, an operator or network controller can reprogram the network to utilize encryption device 42 which is available as a backup.

Similarly, the digital service unit 12 may be receiving information destined for low speed terminal 32 in which case call processor 20 may recognize a request to connect the digital service unit to low speed terminal 32. This data destined for the low speed terminal 32 passes to the aggregation circuit 38 which acts as a deaggregation circuit and places the data back on the TDM bus 10 where it is received by the asynchronous interface 22 which passes the information along to low speed terminal 32. In the other direction, low speed terminal 32 places data on the TDM bus 10 via the asynchronous interface 22. The low speed terminal data is aggregated together with all of the other asynchronous data sources coupled to asynchronous interface 22. This aggregated data is passed to aggregation circuit 38 which separates the low speed terminal data from 32 and passes it along to the digital service unit 12. Numerous other scenarios are possible and will occur to those skilled in the art.

Figure 2:
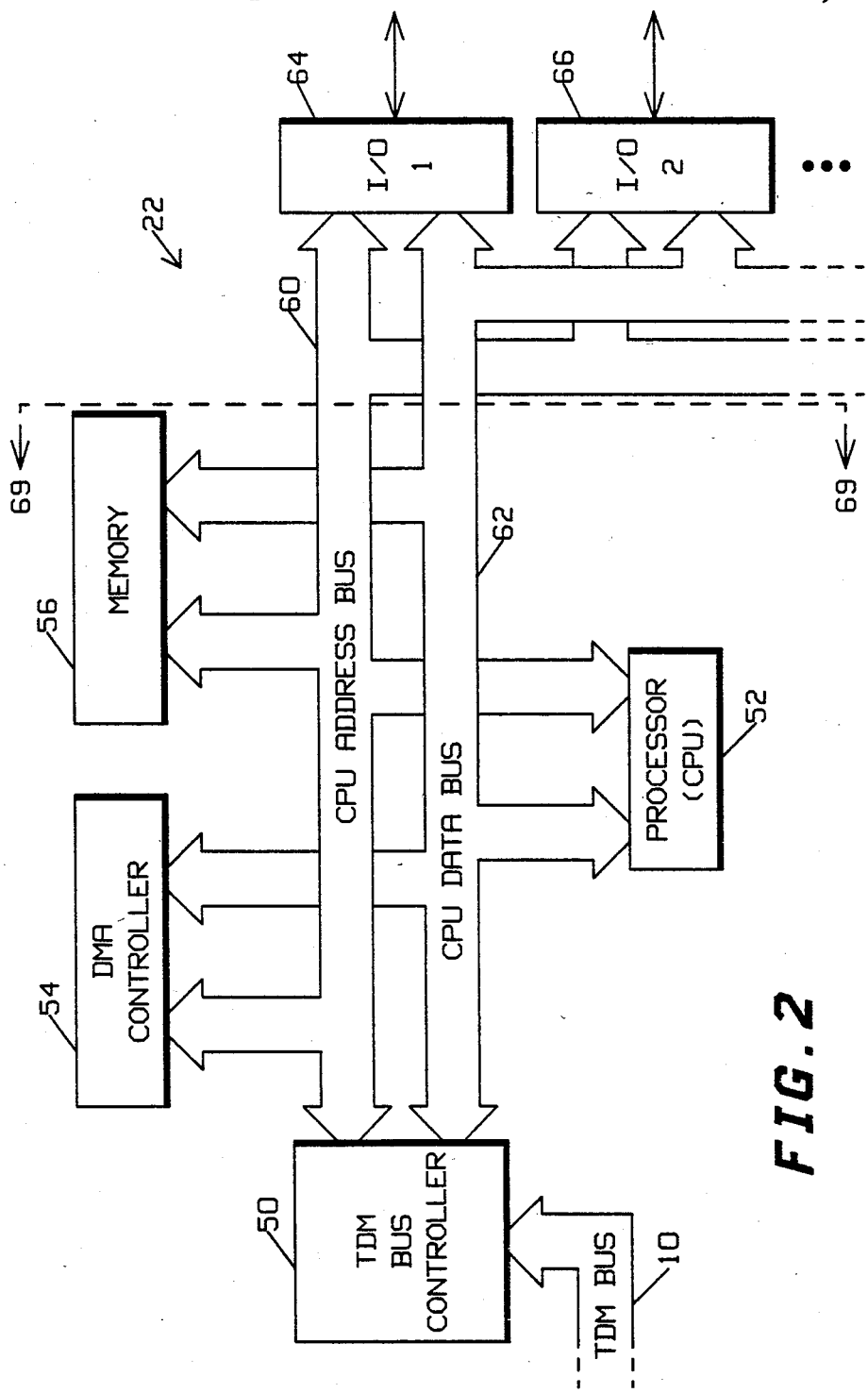
FIG. 2 shows a block diagram of an exemplary asynchronous interface circuit using the TDM bus controller of the present invention.

Turning now to FIG. 2 an example configuration of an asynchronous interface circuit using the TDM bus controller of the present invention is shown. Those skilled in the art will recognize that each of the devices connected to TDM bus 10 will utilize a TDM bus controller 50 in much the same manner and the asynchronous interface shown is illustrative of the connection to and use of such TDM bus controller. The TDM bus controller 50 is connected directly to the TDM bus 10 and is able to transmit/receive data to/from TDM bus 10. The typical configuration will include a processor 52, a direct memory access (DMA) controller 54 and memory 56 each coupled to TDM bus controller 50 via an address bus 60 and a data bus 62. Memory 56 includes both program memory and working memory as required. In some circuit modules, the memory may include ROM, RAM and even mass storage such as disk storage as required for the individual purpose of the circuit module. For the example asynchronous interface, only ROM and RAM is needed.

In order to interface with the low speed asynchronous devices, an input/output (I/O) circuit 64 is also attached to address bus 60 and data bus 62. Duplicate circuits 66 are provided for each asynchronous output from the asynchronous interface 22. In operation the TDM bus controller 50 will place data received from the TDM bus 10 on the data bus 62 where DMA controller 54 physically removes the data from data bus 62 and places the information in memory 56 in a conventional manner. Under the control of processor 52, I/O circuit 64, 66 etc., then extracts the information directly from memory 56. In the other direction, I/O circuit 64, for example, would place information on the data bus 62 where DMA controller 54 places the information in memory 56 to be extracted by TDM bus controller 50 and placed on TDM bus 10. In the present embodiment, data transfers may take place via interrupts or DMA using a common bus. In other embodiments, as will be described, DMA driven data transfers and interrupt driven data transfers may be separated and provided on separate buses.

Those skilled in the art will recognize that processor 52 may in general include most any appropriate general purpose microprocessor, but suitable hardware substitutes may be made in place of a general purpose processing machine. The broken line 69 divides the portion of the figure which is common to most applications of the TDM bus contoller from those devices specific to the example asynchronous interface application. The circuitry to the left of 69 is the common circuitry used in most applications.

Figure 3B:
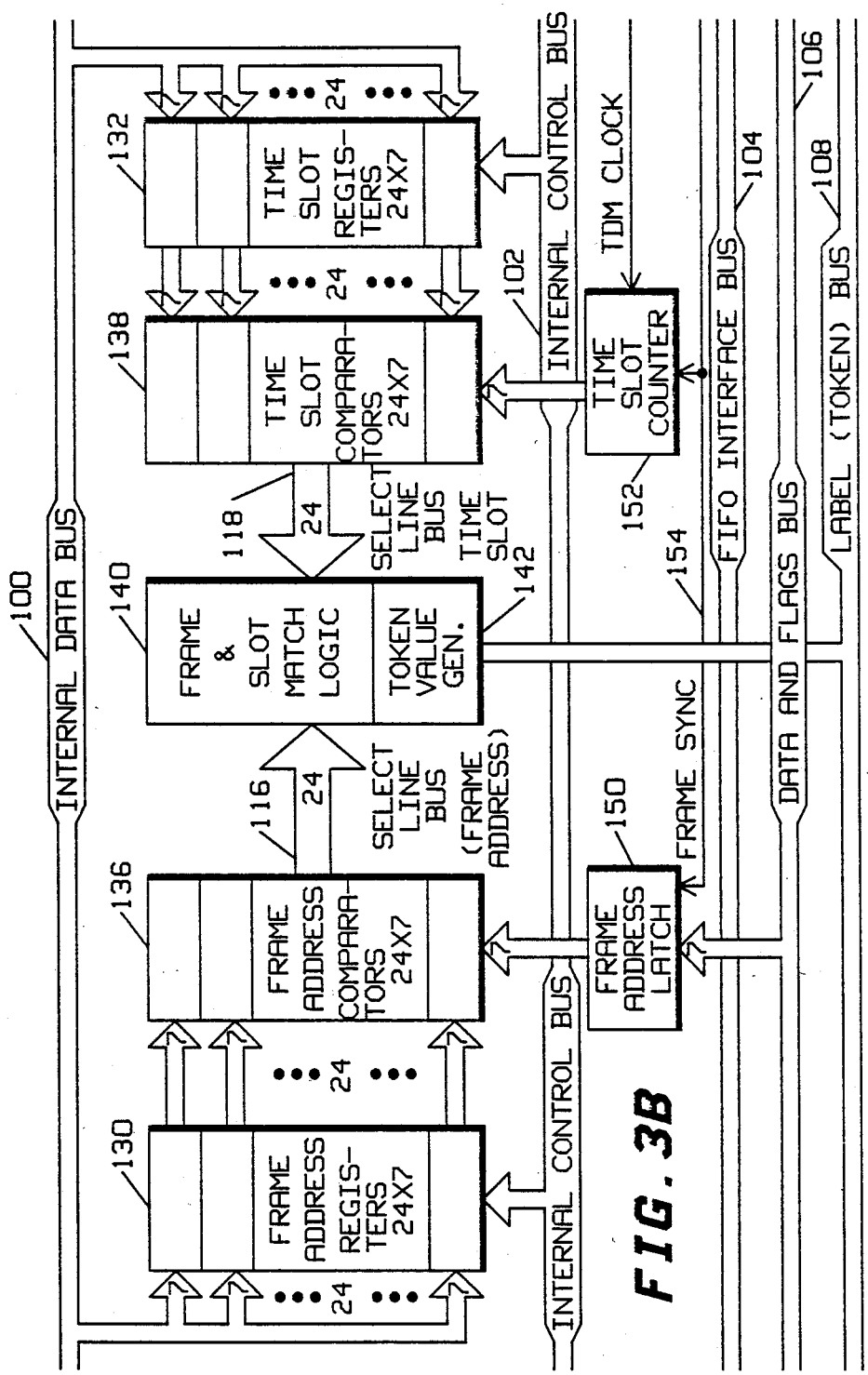
FIG. 3 is a detailed block diagram of the TDM bus controller of the present invention including FIG. 3a, FIG. 3b, and FIG. 3c.

Turning now to FIG. 3 a more detailed view of the TDM bus controller 50 of the present invention is shown. The TDM bus controller of FIG. 3 is preferably implemented in the form of a single semiconductor integrated circuit, but this is not to be limiting as other implementations are also possible and contemplated. FIG. 3 is broken into three drawings labeled FIGS. 3a, 3b and 3c which may be placed side by side as shown in FIG. 4 to produce an entire drawing of one embodiment of the TDM bus controller circuit 50. The TDM bus controller 50 includes a number of internal buses used to route data, flags, control information etc., around the bus controller. The main buses used internally are the internal data bus 100, the internal control bus 102, the FIFO interface bus 104 (for the FIFO embodiment), the data and flag bus 106, the label (token) bus 108, the flag bus 110, the TX/RX vector bus 112, the vector bus 114, the frame address select line bus 116 and the time slot select line bus 118. The internal data bus 100 is similar to the CPU data bus 62 after passing through buffers 120. The internal data bus 100 is coupled to data flag registers 124 and data registers 126 as well as frame address registers 130 and time slot registers 132.

The internal data bus 100 carries data to be transferred into and out of the TDM bus controller 50. The internal control bus 102 carries internal signaling such as register select lines for registers 120, 124, 126, 130, 132 and 164. The FIFO interface bus 104 carries transmit and receive DMA enable signals and transmit and receive interrupt enable signals in the present embodiment. The label bus 108 (or token bus) carries a register label as will be described in more detail later. The flag bus 110 carries the data valid, control/data, read/write, interrupt enable and DMA enable flags.

The internal data bus 100 is also monitored by a watch dog timer 134. The watch dog timer must be periodically updated by the processor 52. If the processor 52 fails to update the watch dog timer 134, it is assumed that some sort of error has occurred and the timing and control circuit 180 issues a reset command to the processor 52. Other corrective action may also be taken upon detection of an error by the watch dog timer, such as initiation of diagnostics and/or reporting of error to a diagnostics controller.

The frame address registers 130 are each coupled to frame address comparators 136 which produce a one line output for each of the registers. This one line output is placed on the frame address select line bus 116 to indicate which register is a match with the digital word present in a frame address latch 150. The current frame address is received over the TDM bus and stored in latch 150. It will be appreciated by those skilled in the art, that the frame address and time slot can be concatenated to form a time slot tag which may be useful.

A similar process occurs at time slot comparators 138 which compares the values in time slot register 132 with a stored value in a timer slot counter 152 and places a one line output on time slot select line bus 118 for each register to indicate if a match has been achieved. The select line bus outputs 116 and 118 enter a circuit shown as frame and slot match logic 140 which points to or looks up a token value (or register label) in the token value generator 142 and this label value is placed on the label bus 108. The time slot counter 152 is incremented with each TDM clock pulse and is reset to zero by the frame sync pulse. Pipelining the comparisons may be used to implement the TDM controller in a manner which provides high bus speeds. In other embodiments, multiple tokens may be generated simultaneously.

The terms "token" or "token value" or "label" or "register label" are used synonymously herein means a digital word which is generated by the token generator 142. This token value is essentially a digital word which is used as a label for the registers which contain the information to be accessed. This "token" or "register label" is used as a pointer throughout the TDM bus controller to facilitate rapid transfer of information. In analogous implementations of the present invention, flags may be used to serve the same purpose of the register labels.

According to the present embodiment, the token value (register label) placed on the label bus 108 is stored in either a receive control FIFO 160 or a transmit control FIFO 162, depending upon the direction of information flow, which are also coupled together by flag bus 110 and internal control bus 102 as well as the FIFO interface bus 104. By maintaining the register labels in FIFO's 160 and 162, automatic proper ordering of the data is maintained. In addition, the FIFO's assure that lower priority communications channels are serviced since all information is handled in the order placed in the FIFO. The output of the receive control FIFO and the transmit control FIFO is applied to a FIFO output selector 164 which is coupled to an I/O vector register 166. The term "vector" as used herein means the token (register label) plus a control/data flag associated with the transferred data. The output of I/O vector register 166 is the vector bus 114 which is coupled to a vector buffer 168 and a vector output port through buffer 170. The major blocks of the circuit are also connected to a timing and control circuit 180 which receive as inputs a CPU read line, a CPU write line, a CPU chip select, a TDM clock, a receive acknowledge and a transmit acknowledge. As outputs, the timing control circuit produces a receive and transmit interrupt and a receive and transmit DMA request as well as providing TDM clock and frame sync signals and the output of watch dog timer 134. The timing and control circuit 180 also is coupled to the CPU address bus and the TDM control bus and TDM data bus. The register label is a 5 bit word in the present embodiment which allows up to 32 registers, but this depends upon the actual number of registers 130 and 132 which are being implemented and is not to be limiting.

It should be noted that the frame and time slot structure can be duplicated to allow continuous diagnostic monitoring so that duplicate structures can be switched in for fault tolerance.

Referring to FIG. 3 and predominantly to FIG. 3b at present, the operation of the TDM bus controller 50 serves to identify the frame and time slot over which data is to be transferred and to actually effect the transfer. Each device using the TDM bus is assigned one or more frames and time slots over which to carry out communication over the TDM bus. These frame and time slots are assigned at the time of power up or system reset and are stored in the frame address registers and the time slot registers of the TDM bus controller. Thus each device on the bus is looking for particular frames and time slots over which to carry out communication. Each frame and time slot combination essentially equates to a single simplex connection.

In FIG. 3, Blocks 114, 120, 166, 168 and 170 comprise a CPU interface 190. Blocks 112, 160, 162 and 164 comprise one embodiment of a flow control circuit 195 which utilizes FIFO's. Other embodiments of flow control circuit 195 will be described later which utilize a circular register or a priority encoder. Other embodiments may occur to those skilled in the art.

In order to provide maximum versatility, data on the TDM bus is arranged in user configurable or bandwidth allocator determined master frames made up of frames. (Such arrangements are often alternatively referred to as frames and subframes respectively.) Each frame contains a plurality of time slots. The master frame may have up to $2^8$ frames each having up to $2^8$ time slots in the present embodiment, but this is not to be limiting. The number of time slots in each frame is variable with each TDM clock pulse equating to one time slot. The master frame will preferably be made up of frames which are grouped according to the speed of data contained in the frames so that high speed data frames are duplicated throughout the master frame often enough to meet the highest speed requirement for that data. In the preferred embodiment, each time slot carries 14 bits of information made up of 9 bits of data plus control information, but this also is not limiting. The frames making up the master frames are not necessarily uniform in size, but rather can be configured in any configuration desired with no requirement to order of repetition.

Figure 5:
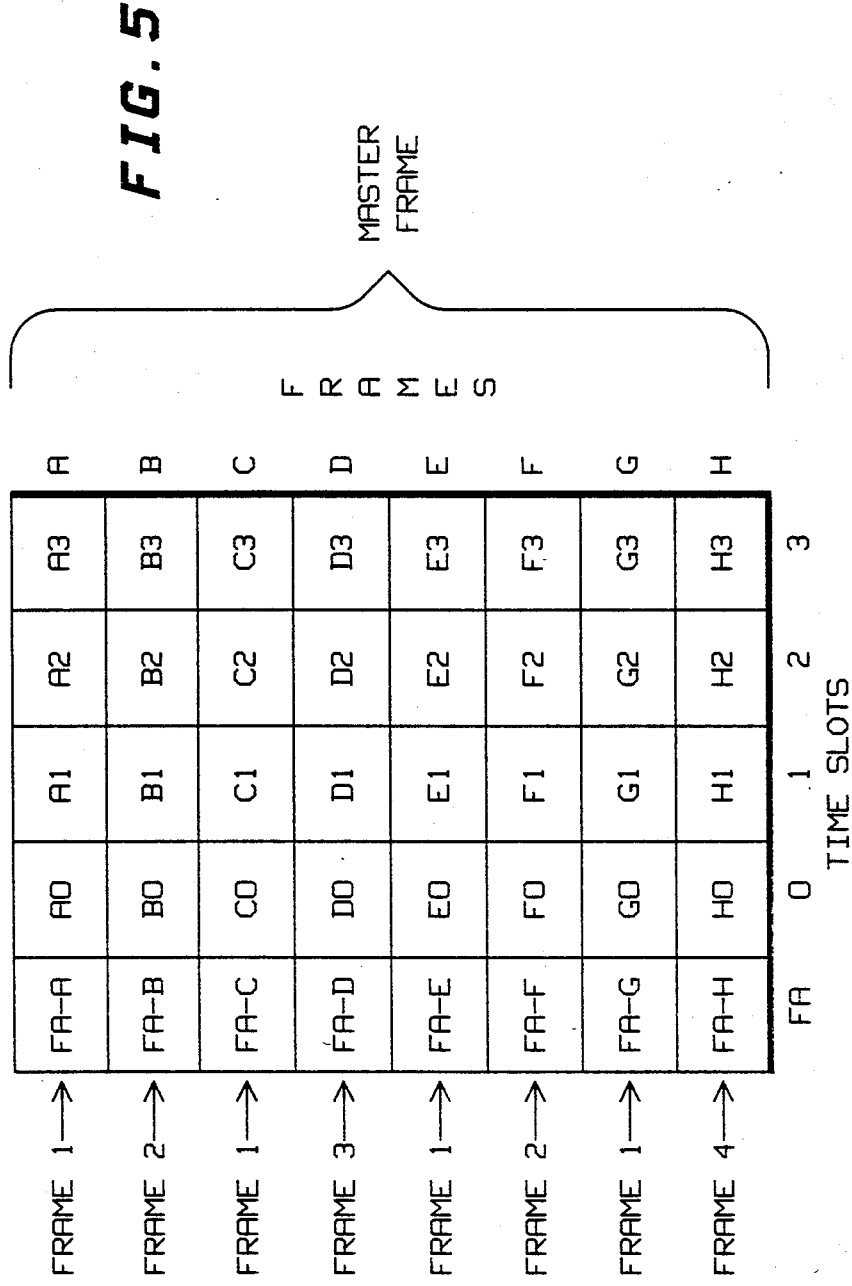
FIG. 5 shows an example master frame which may be used in the present invention.

An example frame structure is shown in FIG. 5. In this simple example, the master frame is made up of a total of eight frames labeled A-H. The rows of FIG. 5 represent these frames A-H. The columns of the master frame of FIG. 5 represent the time slots which are labeled 0-3 for a total of four time slots carrying actual data. The time slot labeled FA represents a time slot utilized for the frame address. For example, frame A will have a frame address which identifies it as frame A designated FA-A as shown. Each individual time slot for this example is designated with a two character code the first of which indicates the frame an the second of which indicates the time slot. These designations provide for simple comparison to FIG. 6. In this simple example, a variety of data speeds may be accommodated as previously described by repetition of various frame structures as needed to accommodate higher capacity channels. For example, a frame structure called frame 1 is repeated in frames A, C, E and G. A frame structure shown as frame 2 is repeated in frames B and F. Frame structures shown as frame 3 and frame 4 are seen only once at D and H respectively. Using this repetition scheme, data carried in frame 1 is allocated four times the bandwidth of data carried in frame 4 or 3. Similarly data in frame two has half the bandwidth available to frame 1. Of course this frame structure is not to be limiting as it is determined by the bandwidth allocator to assure that each device on the TDM bus is allocated adequate bandwidth according to it's needs.

As previously noted the frame structure may be user defined and is limited in the illustrated embodiment to a maximum of 128 frames each of which may have up to 128 time slots. In other embodiments, for example, a limit of 512 frames and 256 time slots may be used. This frame structure may be dynamically reconfigured as required for changes in system configuration or channel capacity by appropriately writing frame and time slot designations to the appropriate frame and time slot registers. While often, a frame structure such as FIG. 5 with repeating frames will be utilized, it should be noted that there is no requirement that there be repeating frames. In addition, it is contemplated for some embodiments of the present invention that additional time slots may be set aside for use by the system in addition to the FA slot. These additional time slots are not shown in FIG. 5 but may be placed, for example, immediately after the frame address slot and may be used to carry various system control, diagnostics, status etc. information as desired. In addition, there is no need for each frame to be identical in length to the other frames as shown in FIG. 5. The beginning of a new frame is marked by a frame sync pulse from the Master timing circuit and can occur as required to effect the master frame structure. Such modifications are intended to fall within the scope of the present invention.

Figure 6:
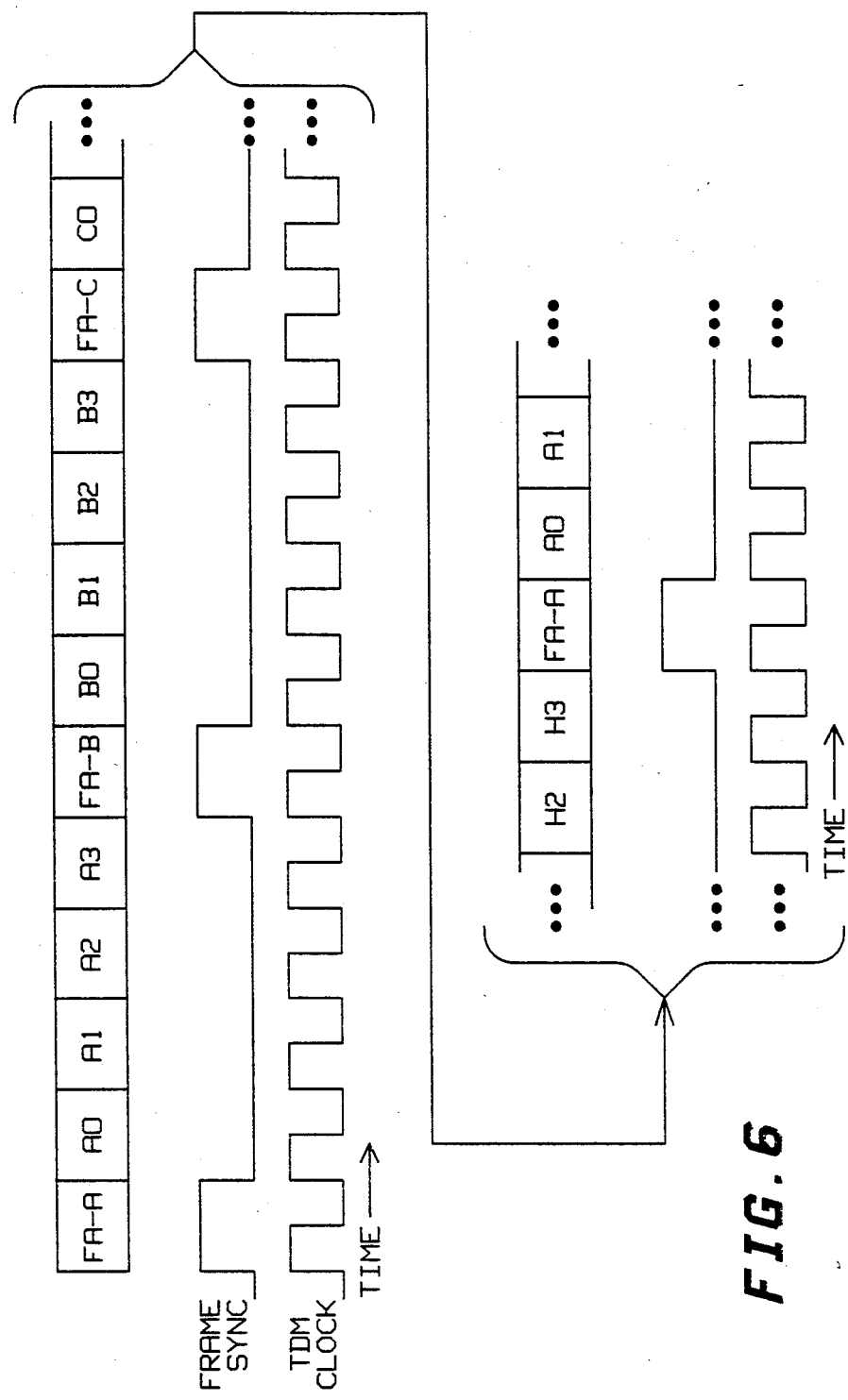
FIG. 6 shows the master frame of FIG. 5 and it's relationship to the frame and slot timing.

It should be noted that the master frame of FIG. 5 is arranged is the form of a matrix for convenience in conceptualization. However, in operation, it is more appropriate to visualize the frame as a serial stream of time slots as shown in FIG. 6. According to the preferred embodiment, each time slot carries 14 bits of information of which nine are reserved for data and the remaining five are used for control information. In the preferred embodiment, each time slot is on the order of 100 ns duration. In the case of the frame address time slots, the frame address is actually carried within the nine bit data portion.

FIG. 6 illustrates the example data structure utilized in the present invention in which a frame address is followed by a plurality of time slots containing data and control information, none of which have more conventional destination addresses or source addresses associated with them and forming part of the information on the bus. The system maintains track of the data by reading the frame addresses and merely counting time slots in between frame addresses to identify the particular time slots. Clock signals from the TDM bus is used to increment the time slot counter to keep track of the particular time slot. The frame sync pulse from the TDM bus resets the time slot counter to zero at the beginning of each frame. Internal clocks having serveral phases may be needed to effect all operations described herein as will be appreciated by those skilled in the art.

Referring back to FIG. 3 taken together with FIG. 6, when data comes in on internal data bus 100, the frame sync line 154 latches the address of the frame into latch 150 and clears time slot counter 152 (each time slot is equivalent to a 14 bit word). When a match is detected at 136, the TDM controller 50 basically awakes to the possibility that a data transfer is needed. Timing and control circuit 180 determines if there is in fact data to be moved and looks at a direction flag (read/write) to determine if data is to be put on or taken off of the bus. The register label (token) is used as an internal address of data and flags in data and flag registers 126 and 124 respectively to allow quick and easy access to the data.

The data registers 126 hold the data that will be sent or received over the TDM bus. A Data valid flag (register 124) is automatically set when data is written into a data register. The data valid flag is automatically cleared when the data written by the microprocessor is sent to the TDM bus 10 for a transmit over the bus. The data to be sent or received can be control information or user data. The Control/data flag is set by the microprocessor when control information is to be transmitted and set by the TDM bus 10 if control information was received. The control/data flag is transmitted with the data over the TDM bus 10.

The read/write flag tells the TDM controller 50 the direction of data flow during a connection. This flag is written when the processor 52 initializes the internal registers. The Interrupt Enable Flag enables the TDM controller interrupt request pin if a connection is made for the appropriate data register. The register label is loaded into the receive or transmit FIFO of flow control circuit 195 depending upon the read/write flag. The DMA enable flag enables the TDM controller's DMA request pin if a connection is made for the appropriate data register.

The frame sync pulse indicates the beginning of the frame and latches the frame address into the frame address latch 150 and clears the time slot counter 152. The frame sync pulse signal and the TDM clock are inputs to the TDM controller from the TDM bus 10.

The frame address latch 150 holds the current frame address used to compare with the frame address stored in frame address register 130. Frame address register 130 is loaded with the frame addresses of frames utilized by the device at hand for communication over the TDM bus as assigned by the microcomputer 46 and TDM bus manager 44 at power up. Similarly, the individual time slots within each frame utilized by the device at hand are stored in the corresponding time slot registers 132. The frame address register 130 holds the address of the frame that data is to be transferred over. The processor 52 configures the frame address register 130 according to the defined function of the system. There is one frame address register per data register. Therefore, each data register is allowed to transfer data in a different frame. All data registers may use the same frame, however. The frame address comparator 136 compares the value in the frame address latch 150 in parallel with each of the frame addresses written into the frame address register 130. The output of the comparators is used to help identify a connection match.

A clock signal from the TDM bus is applied to time slot counter 152 of the TDM controller 10. Each pulse from the clock signal signifies the next time slot and increments the counter. At the beginning of the frame, the frame sync pulse from the TDM bus resets the time slot counter 152 to zero (or some other initial value) to represent the first time slot number in the frame. Those skilled in the art will realize that a multiple phase clock may be used to clock events occurring within the duration of the time slots.

Each data register 126 has an associated time slot register 132. The processor 52 writes the time slot number into the time slot register 132 to indicate which time slot the data is to be transferred over. The time slot comparator 138 compares the value of the time slot counter 152 and the time slot registers 132. The output of the comparators is used to help identify a connection match. For every connection a token value (register label) containing the register location of the comparators that matched is generated. Only one match is allowed to occur at a time. This token value points to the data register 126 associated with the comparators that matched. This token is routed to both the FIFO's of flow control circuit 195 and the timing and control circuit 180. The token is stored in the flow control circuit 195 in one of the FIFO's 160 or 162 depending upon whether it is associated with a receive or a transmit respectively in the present embodiment.

Figure 7:
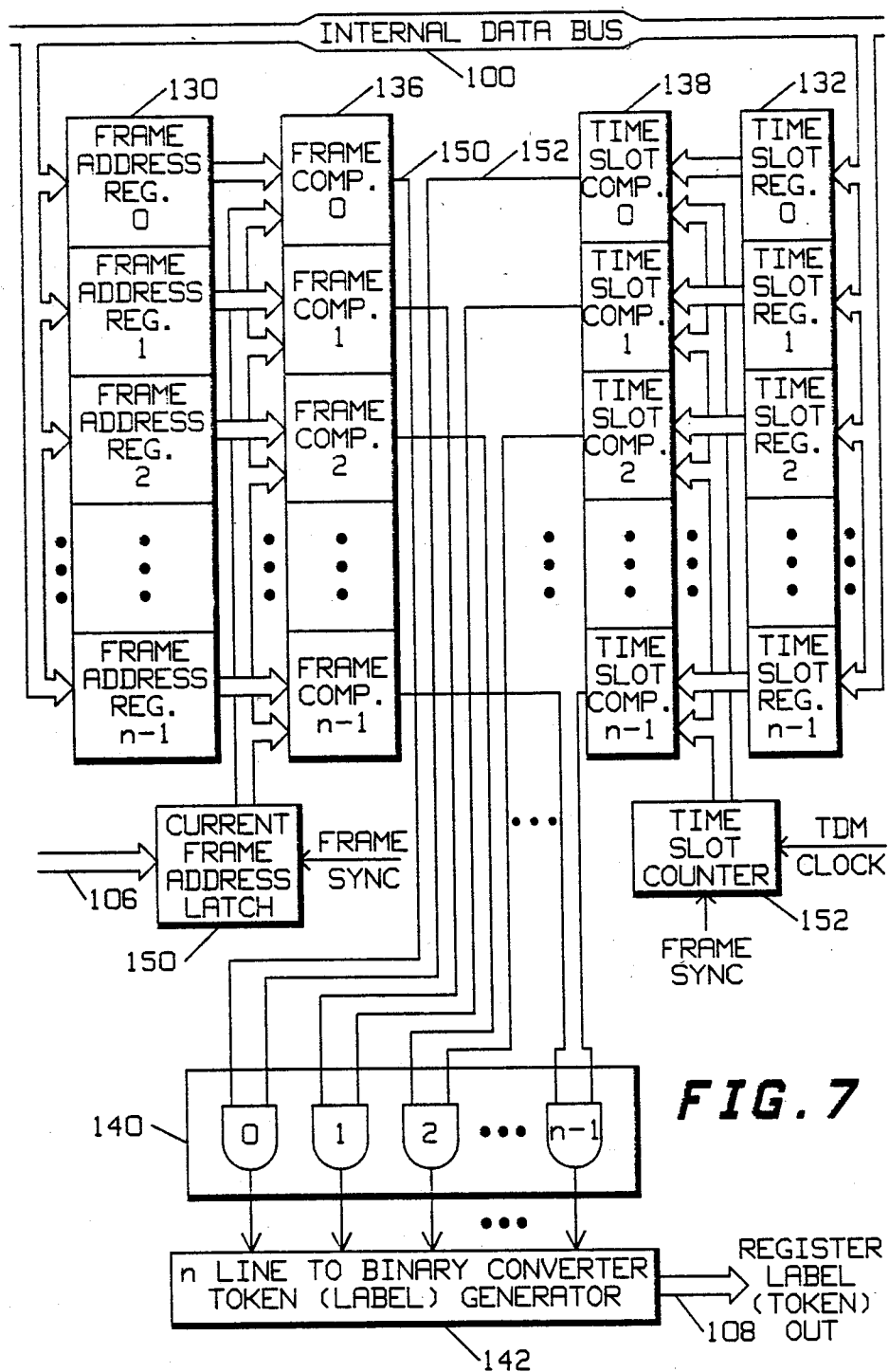
FIG. 7 shows a more detailed schematic block diagram of a portion of FIG. 3.

The circuitry used to determine that a match has occurred is shown in more detail in FIG. 7. The current frame address is held in latch 150 and is provided to each of n total comparators in the general case. In the present embodiment 24 or 32 equals n but this is not limiting. Frame addresses having data to be transferred are stored in frame address registers 130 of which there are also n. The output of each of these registers is applied to the other input of frame comparators 136 and each frame comparator produces a 1 bit output indicating the presence or absence of a match between the current frame address and the frame address stored in registers 130. In a similar manner, time slot counter 152 generates the current time slot by resetting upon receipt of a frame sync pulse and counting TDM clock pulses to produce the current time slot which is applied to the input of each of n time slot comparators 138. Time slots containing data to be transferred are stored in the n time slot registers 132. The outputs of each of the n time slot registers 132 is applied to an associated time slot comparator 138 which produces a one line binary output indicative of whether or not an exact match occurs. The time slot comparator output and the frame comparator output for each associated frame and time slot are combined in logic 140 which may be basically a plurality of AND gates to produce an n line output which is applied to an n line to binary convertor for purposes of generating the label. This converter is a conventional n line to binary convertor which produces a binary output on the register label bus 108.

By way of example, assume that the device at hand is utilizing frame B, slot B3 and frame F, slot F3 for communication over the TDM bus. In this case, for example, frame address register 0 could be loaded with a code indicating frame B and time slot register 0 could be loaded with a code indicating time slot 3 at power up. Similarly, frame address register 1 could be loaded with a code indicating frame F and time slot 1 could be loaded with a code indicating time slot 3 at power up. When the current frame stored in frame address latch 150 matches the frame address in register 0, for example, and the time slot counter 152 incremented to time slot 3, lines 150 and 152 would both go to a logic high causing the output of AND 0 of logic 140 to go to a logic high while the remainder of the AND gates are at a logic low. The label generator 142 would then generate an appropriate label indicating a match at the frame and time slots stored in registers 0 of 130 and 132. Similarly, a match at frame address and time slot registers 1 of 130 and 132 would result in the output of AND gate 1 of 140 going high and generating a label indicative of registers 2 in 130 and 132 (frame F, slot F3). Of course, this example embodiment precludes having simultaneous matches since only one at a time could be loaded into the FIFO. But, those skilled in the art will appreciate that multiple FIFOs or other known techniques may be used to allow for simultaneous matches.

Turning back to FIG. 3 there are two first-in-first-out (FIFO) memories shown in this embodiment of flow control circuit 195 of the TDM controller, namely the receive (RX) FIFO 160 and transmit (TX) FIFO 162. The inputs to the RX FIFO 160 and TX FIFO 162 are the token value (address label), control/data flag, DMA enable and interrupt enable flags. The FIFO memories 160 and 162 are used to store the status of connection activity from the TDM bus 10 in the order of occurrence. The information stored in the FIFO's will be presented to the processor when an interrupt or DMA acknowledge is made. The processor may also poll the TDM controller 50 for the information stored. This procedure will ensure the processor will handle the first occurrence first with priority given to RX or TX at the discretion of the user. Also, the use of the FIFO based I/O controller prevents the processor 52 from missing connection activity between processor 52 and the TDM bus 10 due to the high speed of the TDM bus 10 relative to the slow speed of most microprocessors anticipated for use in implementing processor 52.

The I/O vector register 166 contains the next I/O status from the top of one of the FIFOs as determined by which of the ACK inputs of controller 180 is active. An interrupt or DMA acknowledge or a read from the processor 52 will signal the TDM controller 50 to output this register. When connection activity occurs within the TDM controller 50 from the TDM bus 10, a flag is checked to determine if an interrupt or DMA request is to be generated.

The output of the I/O vector register 166 is buffered at 170 and presented to the outside of the TDM controller either by multiplexing or on separate lines. This output may be used to direct a DMA controller to move the data to/from the TDM controller or modify external pointers for data routing. The I/O vector register output is also available to the microprocessor via the data bus to be used in certain embodiments.

The transmission process is as follows. The TDM controller is configured by writes to the frame address register 130 and time slot register 132 corresponding to the data register that is to be used during the data transfer. The read/write flag is set to a write. The DMA enable flag, interrupt enable flag and control/data flag are written as appropriate. When the frame address register 130 and time slot register 132 match the current frame and time slot number the data valid flag is checked to see if the data register 126 contains valid data. If the data register 126 contains valid data, then the data, control/data flag and read/write flag are written onto the TDM bus 10. At this point, a token value is generated, corresponding to the data register address. The timing and control block will load the TX FIFO 162 with the token value, the control/data flag, the DMA enable flag and the interrupt enable flag.

The I/O cycle to the processor interface is generated when the RX and/or TX FIFO'S contain valid status. The timing and control circuit 180 reads the status from the FIFO's and uses the DMA enable flag and interrupt enable flag contained in the status to initiate the DMA or interrupt cycle. When the processor performs a TX acknowledge, timing and control circuit 180 steers the top of the TX FIFO into the I/O vector register 166. At this point the processor knows what data register has transmitted data from the token value contained in the status.

For a burst of TDM bus activity the processor 52 may not be able to keep up, and the FIFO will start to store the status of the data transfer. Processor 52 must be able to maintain the maximum data flow through the device. As the processor 52 processes data transfers, the FIFO will empty out in the order it was loaded thus preserving the data order and assuring service to lower priority data transfers in the FIFO based embodiment of flow control circuit 195.

The receive process is as follows. The TDM controller is configured by writes to the frame address register 130 and time slot register 132 corresponding to the data register 126 that is to be used during the data transfer. The read/write flag is set to a read. The DMA enable flag and the interrupt enable flag are also written as appropriate depending upon whether the data transfer will be interrupt or DMA driven.

When the frame address register 130 and time slot register 132 match the current frame and time slot number, the data valid flag on the data and flag bus is checked. If the data valid flag is set, then the read/write bit on the TDM bus will allow the data into the data register 126. The data valid flag is set when the data register is written to. Along with data the control/data flag is latched. A token value is generated next corresponding to the data register address. The timing and control circuit loads the RX FIFO 160 of the flow control circuit 195 with the token value, the control/data flag, the DMA enable flag and the interrupt enable flag if either the DMA enable flag or interrupt enable flag is set.

The I/O cycle to the processor 52 is generated when the RX and/or TX FIFO's contain valid status. The timing and control circuit 180 reads the status from the FIFO's and uses the DMA enable flag and interrupt enable flag contained in the status to initiate the DMA or interrupt cycle. When the processor 52 performs an RX acknowledge the timing and control circuit 180 steers the top of the RX FIFO 160 into the I/O vector register 166. At this point the processor 52 knows what data register 126 has data from the token value and if the data is control information or user data. Once the processor 52 reads the data, the data valid flag is cleared.

For a burst of TDM bus activity the processor 52 may not be able to keep up, and the FIFO will start to store the status of the data transfer. As the microprocessor interface processes these connections the FIFO will empty out in the order received to preserve the data order and assure service to lower priority devices.

In the receive direction, the processor only receives a register label (token) if there is valid data to be received. In the transmit direction, a token is generated when valid data is to be transmitted. The processor may be accessed by the controller by an interrupt which is followed by an interrupt acknowledge and a read of the token by the processor. A data transfer may then take place immediately without need for transfer of source and destination address information and time consuming work by the processor.

Figure 8A:
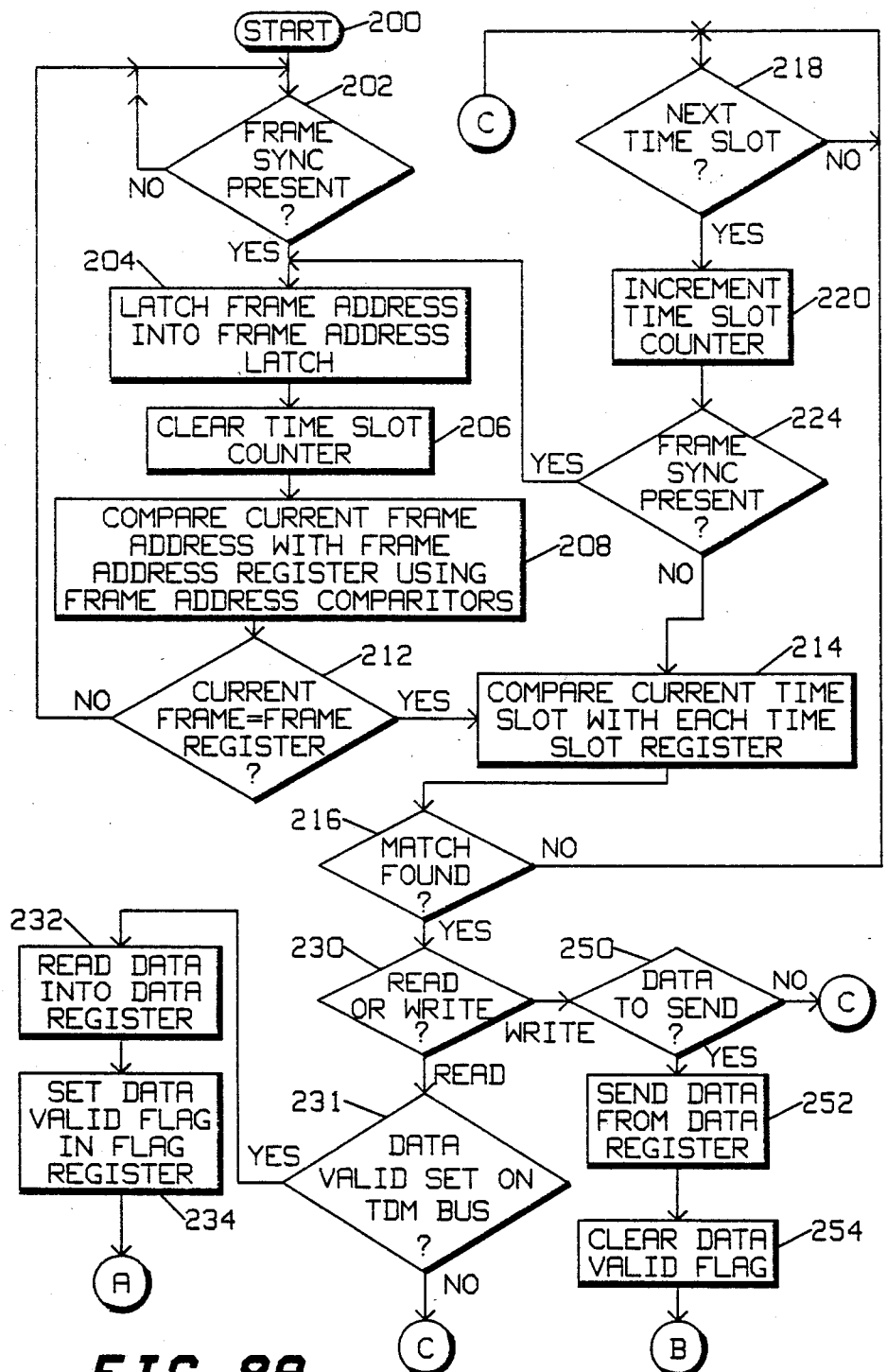
FIGS. 8a and 8b show a flow chart of the operation of the TDM bus controller of the present invention.
Figure 8B:
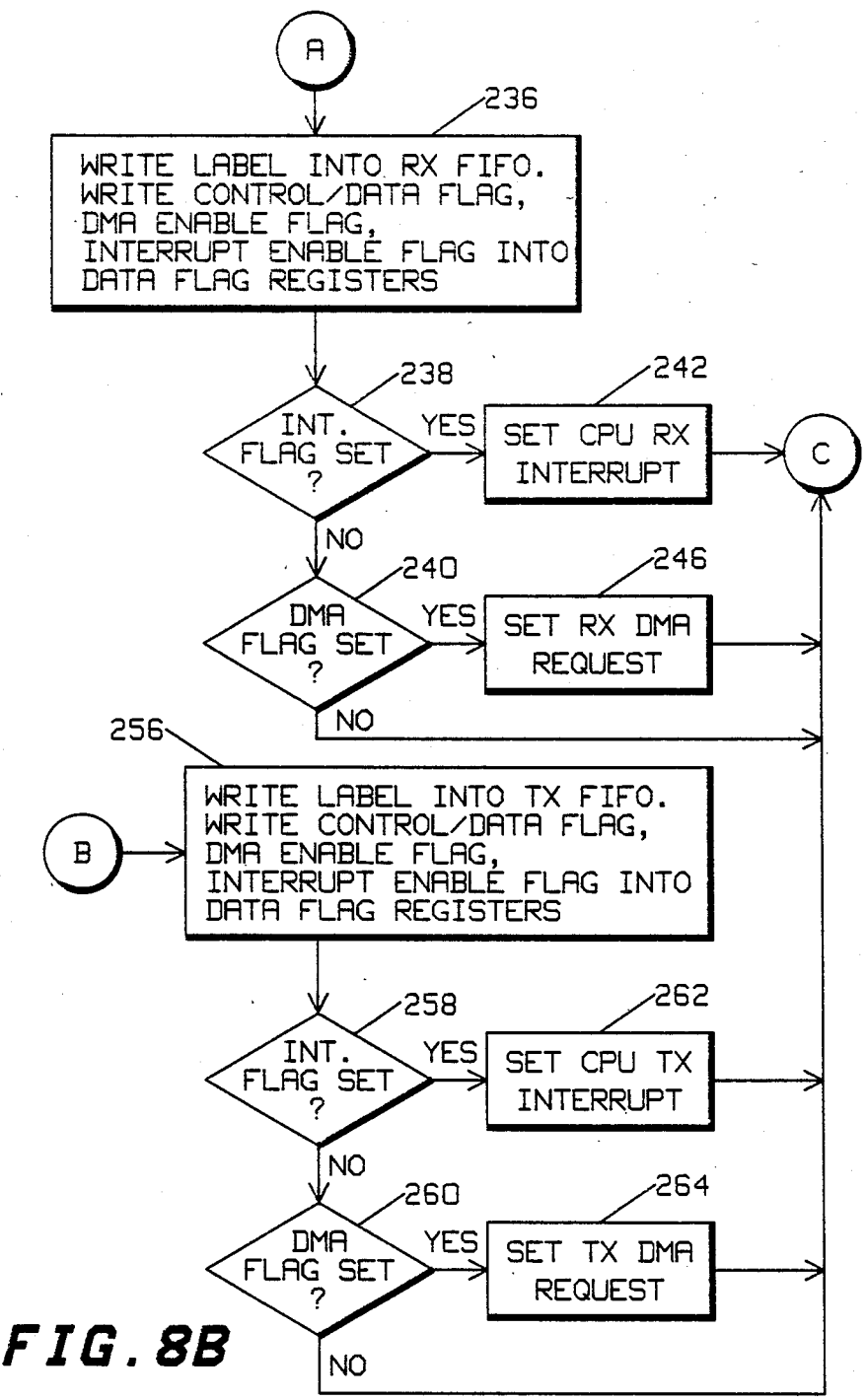

The process as just described in conjunction with the hardware of the preferred embodiment are described in flow chart form in the flow chart of FIG. 8 which consists of FIGS. 8A and 8B. The operation of timing and control circuit 180 is incorporated within the flow chart of FIG. 8 as well as FIG. 9, 10, 11 and 12. The process begins at 200 where control is passed to decision 202 where determination is made as to whether or not frame sync is present. If not, the process waits for frame sync to appear and then control is passed to 204. At 204 the frame address is latched into the frame address register and the time slot counter is cleared at 206. Control is then passed to 208 where the current frame address is compared with the addresses stored in the frame address register using the frame address comparators. If the current frame does not match a frame stored in the register at 212, control is passed back to 202 where the next frame sync pulse is awaited.

If the current frame is present in one of the frame address registers at 212, control passes to 214 where the current time slot is compared with each time slot in the time slot registers. If no time slot match is found at 216, the next time slot is awaited at 218. When the next time slot occurs, the time slot counter is incremented (by the TDM clock) at 220. Control then passes to decision 224 where if frame sync is present control passes to step 204 and if frame sync is not present control passes to step 214.

If a match is found at 216 between current time and one of the time slots in the time slot register control passes to 230 where it is determined if a read or write is to occur. If a read is to occur, control passes to where the data valid flag is checked on the TDM bus. If the data valid flag is not set, control goes back to 218, otherwise control passes to 232 where data is read into the data register. Control then passes to 234 where the data valid flag is set in the flag register. Control then passes to 236 where the label is written into the received FIFO, the control/data flag, DMA enable flag and interrupting able flag are all written into the data flag registers at 236. Control then passes to 238 where the interrupt flag is checked. If the interrupt flag is not set control passes to 240 where the DMA flag is checked. If the DMA flag is not set at 240 control passes back to step 218 where the next time slot is awaited.

If the interrupt flag is set at 238 indicating that an interrupt driven data transfer is to occur control passes to 242 where the timing and control circuit 180 sets the CPU receive interrupt line. Control then passes to 218 as before. If the DMA flag is set at 240, it indicates that a DMA driven data transfer is to occur and control passes to 246 where the timing and control circuit 180 sets the received DMA request line. Control then passes back to 218 as before. If a write operation is to occur at 230 control passes to 250 where it is determined whether or not there is data to send. If not, control passes back to 218. If there is data to send, control passes to 252 where data from the data register is sent to the TDM bus via timing and control circuit 180. Control then passes to 254 where the data valid flag is cleared and control passes to 256.

At 256 the label is written into the transmit FIFO of the flow control circuit. Also the control/data flag, DMA enable flag, interrupt enable flag are all written into the data flag registers. A determination is then made at 258 as to whether or not the interrupt flag is set. If not a determination is made at 260 as to whether or not a DMA flag is set. If neither flag is set, control passes back to 218 as previously. If the interrupt flag is set at 258, the CPU transmit interrupt line is set at 262 by the control and timing circuit 130. If a DMA flag is set at 260 the transmit DMA request line is set by the timing and control circuit 130 at 264. After 262 and 264 control passes back to 218 as previously.

Figures 9, 10:
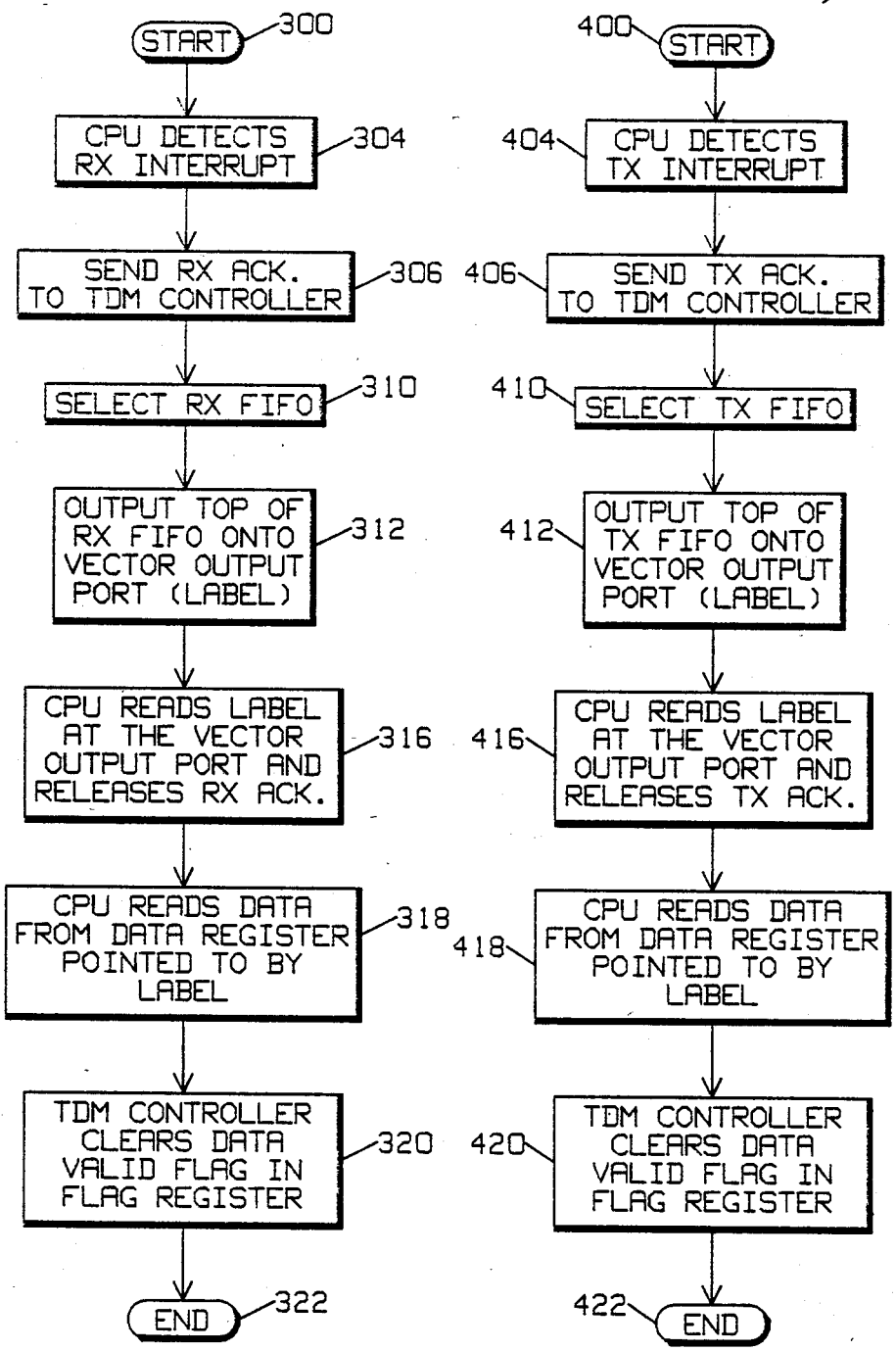
FIG. 9 shows a flow chart of a CPU initiated interrupt acknowledgment cycle for the receive process.
FIG. 10 shows a flow chart of a CPU initiated interrupt acknowledgment cycle for the transmit process.

FIGS. 9 and 10 describe the CPU initiated interrupted acknowledge cycle for the receive and transmit processes respectively. Turning to FIG. 9, the cycle begins at 300 after which the CPU detects a receive interrupt from the timing and control circuit at 304. At 306 the CPU sends a receive acknowledge signal to the TDM controller timing and control circuit 180. The timing and control circuit then selects the receive FIFO of flow control circuit 195 using FIFO output select 164 at 310. The top register of the received FIFO is then placed into the vector output port at 312 so that the vector output port contains the label of the register containing the data to be transferred. At 316 the CPU reads the label at the vector output port and releases the receive acknowledge line. At 318 the CPU reads data from the data register pointed by the label read in step 316. The TDM controller then clears the data valid flag in the flag register at step 320 and the cycle ends at 322.

An analogous process occurs when the transmit interrupt cycle as shown in FIG. 10. The cycle starts at step 400 after which the CPU detects the transmit interrupt at 404. The CPU then sends a transmit acknowledge to the TDM controller at 406 through the timing and control circuit 180. At 410 the timing and control circuit 180 selects the transmit FIFO of flow control circuit 195 using FIFO output select 164. The top register of the transmit FIFO is then placed onto the vector output port at 412 so that the label is available to the CPU. At 416 the CPU reads the label at the vector output port and releases the transmit acknowledge line. At 418 the CPU writes data to the data register pointed to by the label read at step 416. At 420 the TDM controller sets the data valid flag in the flag register to indicate that valid data is present and the cycle ends at 422.

Figures 11, 12:
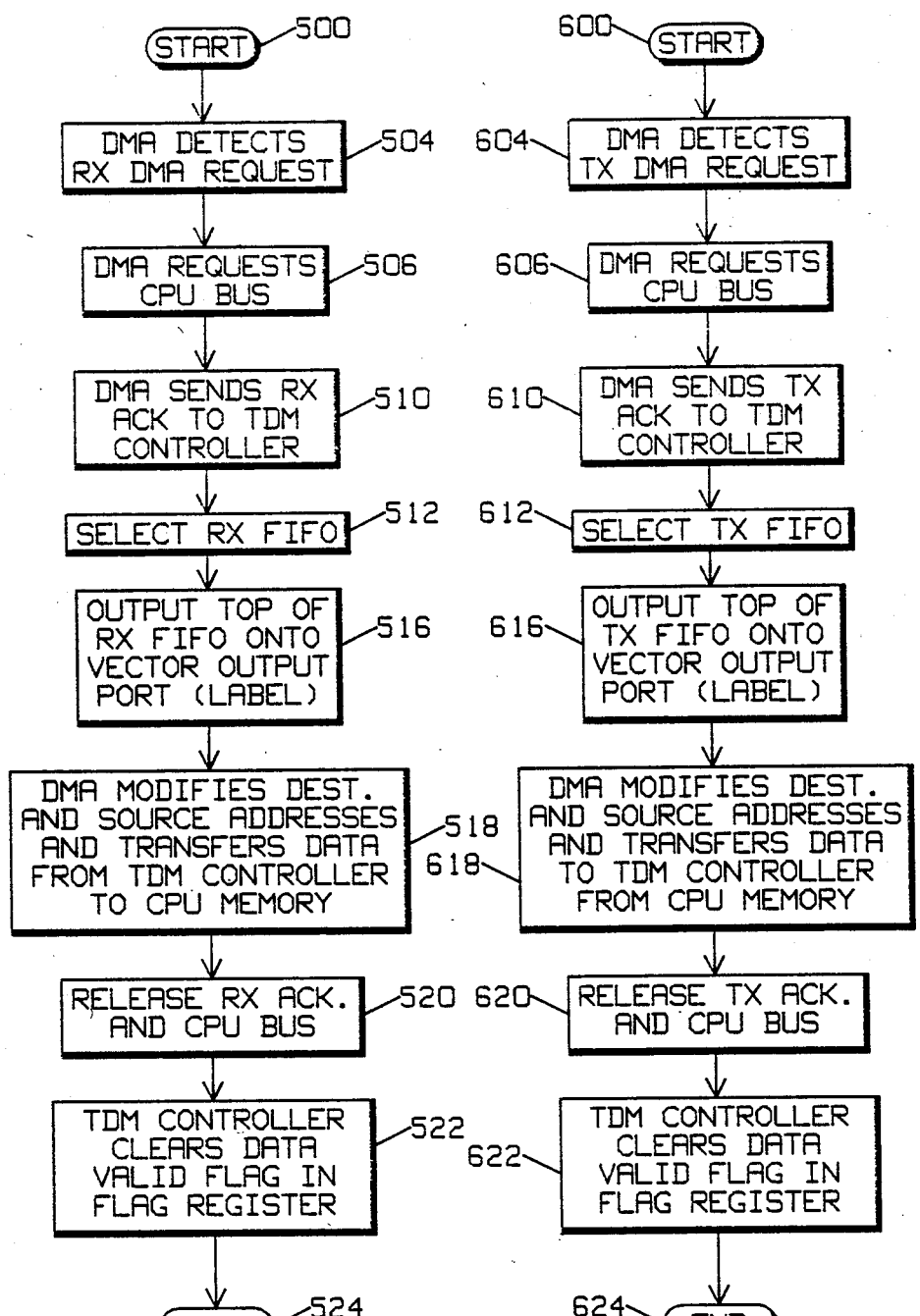
FIG. 11 shows a flow chart of a CPU initiated DMA acknowledgment cycle for the receive process.
FIG. 12 shows a flow chart of a CPU initiated DMA acknowledgment cycle for the transmit process.

Turning now to FIG. 11, a flow chart of a CPU initiated DMA acknowledge cycle for receive begins at step 500 where the DMA detects a receive DMA request at 504. The DMA then requests use of the CPU bus at 506 and sends a receive acknowledge to the TDM controller at 510. The TDM controller selects the receive FIFO at 512 and loads the token at the top of the receive FIFO onto the vector output port at 516. The DMA then modifies the destination and source address and transfers data from the TDM controller to the CPU memory at 518. The DMA then releases the receive acknowledge line and the CPU bus at 520. The TDM controller clears the data valid flag in the flag register at 522 and the cycle ends at 524.

Turning now to FIG. 12, a flow chart of a CPU initiated DMA acknowledge cycle for transmit begins at step 600 where the DMA detects a transmit DMA request at 604. The DMA then requests use of the CPU bus at 606 and sends a transmit acknowledge to the TDM controller at 610. The TDM controller selects the transmit FIFO of the flow control circuit 195 at 612 and loads the token at the top of the transmit FIFO onto the vector output port at 616. The DMA then modifies the destination and source address and transfers data to the TDM controller from the CPU memory at 618. The DMA then releases the transmit acknowledge line and the CPU bus at 620. The TDM controller clears the data valid flag in the flag register at 622 and the cycle ends at 624.

In order to effect a rapid data transfer, the token may be used in one embodiment, as an address modifier for use by the DMA controller. For example, the DMA controller may be signaled by the processor that a data transfer is to take place. The DMA controller then requests and receives access to the processor's data and address bus. The DMA then reads the source address, stores the data word internally and then writes the data to the destination address. The source and destination address of the DMA may be modified with the token value to speed up the information exchange. For example, assume that the source address is hex C000 and the destination address is hex 8000. Assume that the token value generated is a hex 2 which points to a particular register. The token value may be used to modify the above addresses so that the destination address becomes a hex 8200 and the source address becomes a hex C002. This offset points to an unique buffer memory location which contains the data to be transferred. Using this technique serves to direct the DMA to the appropriate buffer therefore using only one DMA channel to route multi-channel data from/to the TDM bus.

Figure 13:
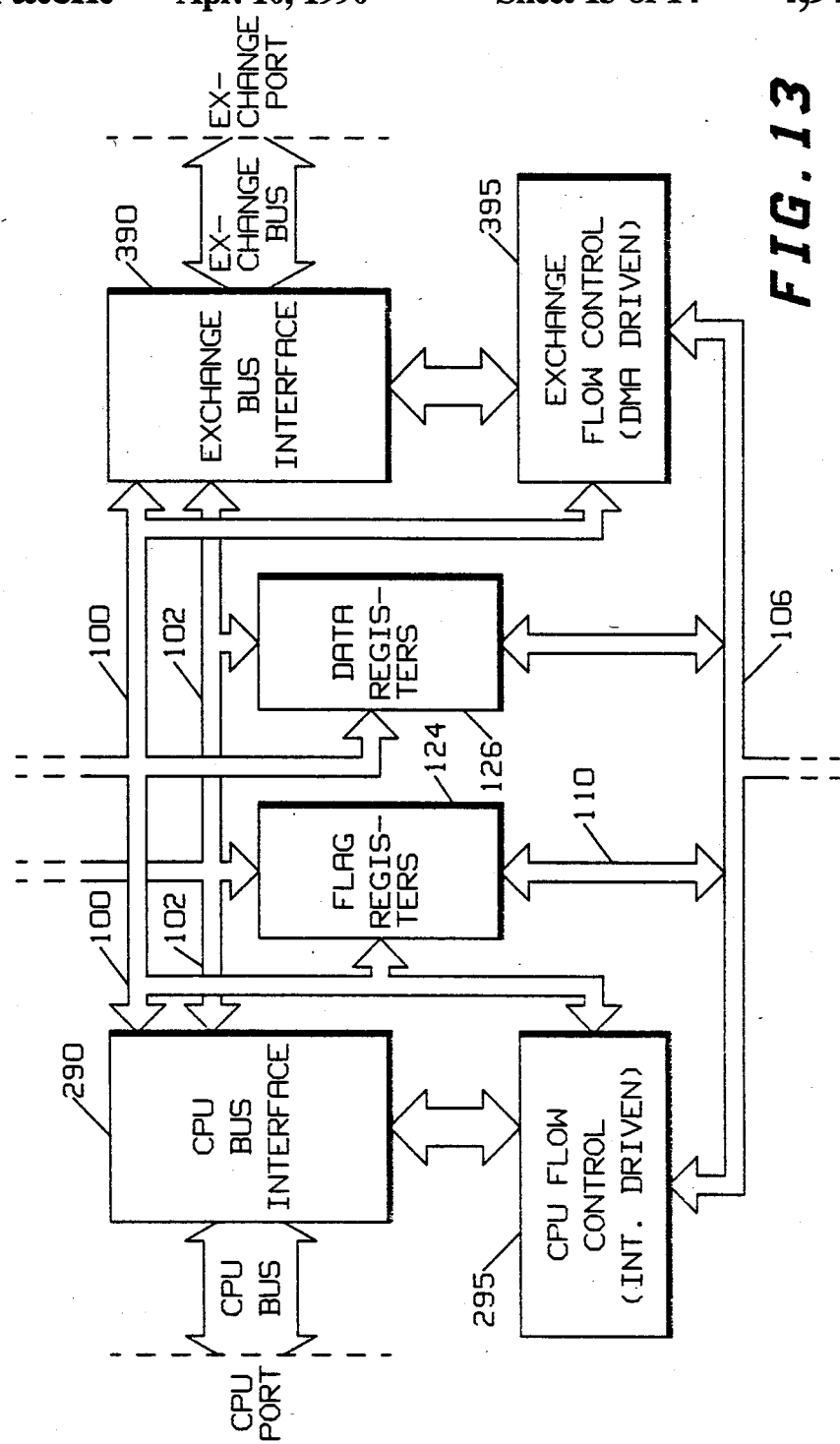
FIG. 13 shows an alternative embodiment using separate DMA driven and INTERRUPT driven exchanges.

Turning now to FIG. 13 an alternative apparatus for flow control is shown. Having described the first embodiment in detail, those skilled in the art will readily make the appropriate modifications to effect the following embodiments. In this second embodiment, a CPU port is provided as well as an exchange port to accommodate both interrupt driven and DMA driven date exchanges. This figure is simplified somewhat to describe only the basic differences between this embodiment and the first described embodiment. In FIG. 13 the CPU port is coupled to a CPU bus interface 290 which is in turn coupled to an interrupt driven CPU flow control circuit 295. In addition, an exchange port is provided which is coupled to an exchange bus interface 390. Exchange bus interface 390 is in turn coupled to exchange flow control circuit 395 which is DMA driven. The bus interfaces and flow control circuits may be similar to that shown in FIG. 3 or may be otherwise embodied as will be described later. In this embodiment, flag registers and data registers 124 and 126 respectively are monitored by the flow control circuits and interrupt driver data exchanges are coupled to the CPU bus while DMA flaged data exchanges are directed to the exchange bus. This arrangement allows for pseudo-DMA transfers to occur over the exchange port while simultaneous exchanges are carried out over the CPU port. The CPU port appears as a memory device to the CPU. The exchange bus port supports pseudo-DMA access to any of the data registers without CPU intervention. This provides a measure of parallel processing of the information flow at the expense of duplicative circuitry in the form of duplicate bus interfaces and duplicate flow control circuitry.

Figure 14:
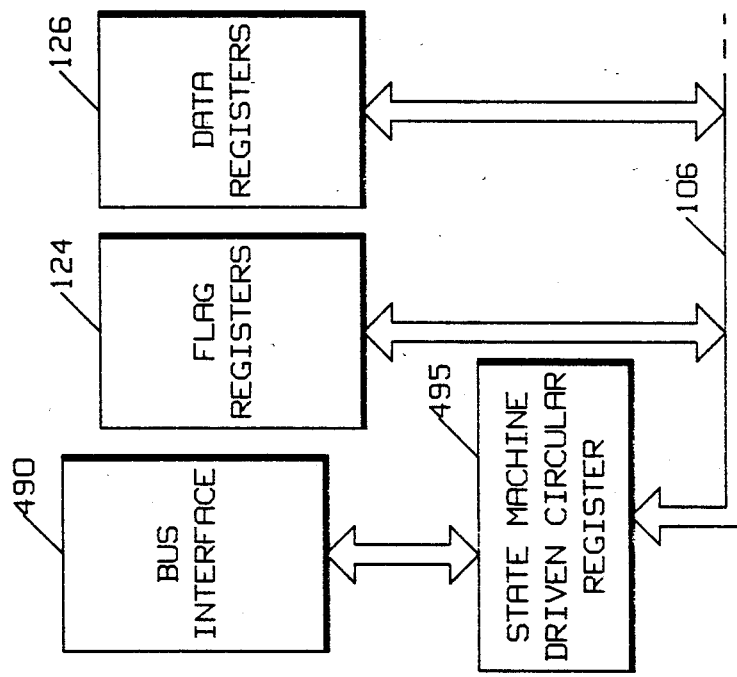
FIG. 14 shows an embodiment of the flow control circuit using a circular register.

Turning now to FIG. 14 and alternative embodiment of the flow control circuitry is illustrated. In this embodiment, the FIFO arrangement of FIG. 3 is replaced by a state machine driven circular register 495. The bus interface circuitry 490 may remain similar to that of bus interface circuitry 190. In this embodiment a circular register stores the address labels (tokens) in a sequential order which is repeatedly sequentially polled by a state machine to determine whether or not there is data to transfer. This embodiment may involve smaller circuitry which may have advantages when implemented in an LSI integrated circuit than that of the previously described FIFO implementation. The circular register may in fact be similar to a counter that counts through each of the possible token codes. When a token is associated by the state machine with a data valid the data transfer is taken over by interface 490. When a data valid is not encountered for a particular token, the state machine rapidly skips to the next numbered token. A trade off in this implementation is that inactive tokens must be skipped over by the state machine to find the next available active token. Also, data order could be lost unless the data is provided with a sequence number in the case of more than one time slot being used per connection. However, this embodiment may be a useful alternative in some implementations.

Figure 15:
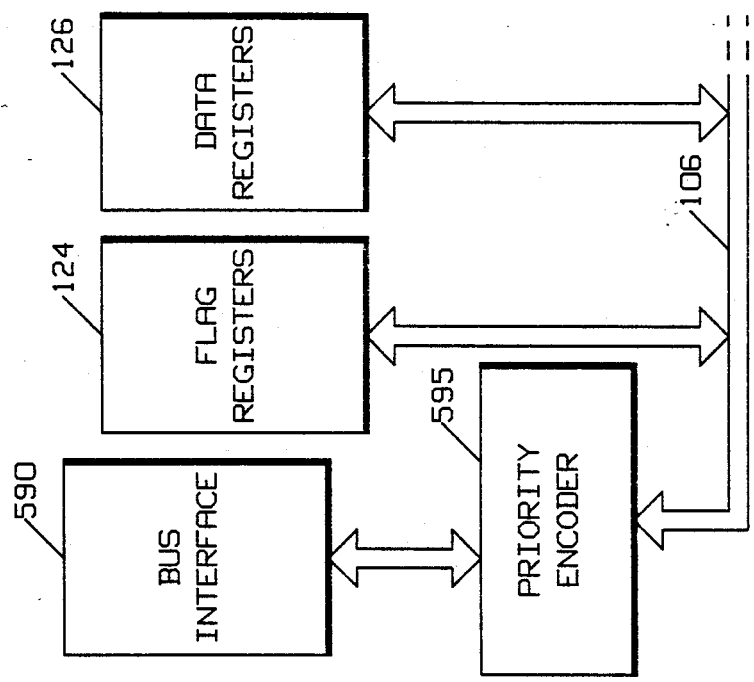
FIG. 15 shows an embodiment of the flow control circuit using a priority encoder.

Turning now to FIG. 15, a third embodiment of the flow control circuitry is shown in the form of a priority encoder 595 which interfaces to a bus interface 590. Bus interface 590 may be similar to bus interface 190. Each connection of this embodiment is assigned a priority which will determine its order of service by the TDM bus controller. In this embodiment, each of the flag registers and data register 124 and 126 respectively are examined in parallel by the priority encoder 595. In the simplest embodiment, and perhaps the most useful, the priority encoder selects the register with the lowest token value associated with it for bus transfer. In more complex embodiments however, the bus transfer may be effected according to any advantageous algorithm for prioritizing connections. When the priority encoder determines which register has priority, the associated register label (token) is passed to the bus interface 590 which then passes the data to the appropriate buses. The priority encoder embodiment exhibits the same problem as the circular register embodiment of FIG. 14 in that more than one time slot allocation per connection can result in erroneous ordering of data. Therefore, for both of the embodiment of FIG. 14 and 15 a sequence number is required or some other mechanism for ordering the data transfers. This embodiment of FIG. 15 exhibits a high degree of parallelism which may be implemented in a smaller area relative to FIFOs on an LSI circuit. In addition, this embodiment provides versatility and implementation of prioritization of channels.

In all three embodiments of flow control circuits described, the implementation of FIG. 3 or 13 may alternatively be utilized so that either one port (the CPU port) can be utilized in either a DMA driven or interrupt driven mode; or CPU port and an exchange port may provided for separate interrupt driven and DMA driven exchanges. Other embodiments may occur to those skilled in the art.

The present invention, therefore, provides a mechanism described in conjunction with several embodiments for rapid data transfers over a TDM bus using an unique TDM bus protocol which minimizes the amount of data which must be transferred to properly route information through the system. Those skilled in the art will appreciate that the present invention may be implemented in a variety of ways including custom LSI circuitry. Although the disclosed process flow charts imply sequential processing, this is not to be limiting since it is highly desirable to use parallelism in the process where possible to speed up the operation. Those skilled in the art will also recognize that software based embodiments implemented on a programmed general purpose processor are also possible in which the tokens may be implemented via software flags and the like. Other embodiments will occur to those skilled in the art.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. An apparatus for controlling access to a time division multiplexed (TDM) bus, comprising in combination:
    frame address register means having a plurality of storage registers for storing one or more frame addresses designated for use in communicating over said TDM bus;
    frame address latching means for storing a current frame address;
    frame comparing means, coupled to said frame address register means and said frame address latching means, for comparing said designated frame addresses with said current frame address and for producing a first signal indicative of the storage register containing a frame address matching said current frame address;
    time slot register means having a plurality of storage registers for storing a time slot number designated for use in communicating over said TDM bus;
    time slot generating means for generating a current time slot number by counting time slots following a frame address;
    time slot comparing means, coupled to said time slot register means and said time slot generating means, for comparing said designated time slot number with said current time slot number and for producing a second signal indicative of the storage register containing a slot number matching said current time slot number;
    label generating means, coupled to said frame comparing means and said time slot comparing means for receiving said first and second signals and for generating a label unique to said first and second signals; and
    data transferring means, responsive to said label, for transferring a data word to or from said TDM bus.

2. The apparatus of claim 1, wherein said data transferring means further comprises:
    determining means for determining if data is to be transmitted or received over said TDM bus;
    a register for storing data;
    a FIFO for storing said label;
    means for reading said label from said FIFO to identify said data word to be transferred; and
    means for transferring said data word to said TDM bus.

3. The apparatus of claim 1, wherein said data transferring means further comprises:
    determining means for determining if data is to be transmitted or received over said TDM bus;
    a register for storing data;
    a circular register for storing said label;
    means for reading said label from said circular register to identify said data word to be transferred; and
    means for transferring said data word to said TDM bus.

4. The apparatus of claim 1, wherein said data transferring means further comprises:
    determining means for determining if data is to be transmitted or received over said TDM bus;
    a register for storing data;
    a priority encoder for storing said label; and
    means for reading said label from said priority encoder to identify said data word to be transferred; and
    means for transferring said data word to said TDM bus.

5. The apparatus of claim 1, further comprising means for determining if data is to be transmitted or received over said TDM bus and means for transferring data from said TDM bus to a receive data register when data is to be received from said TDM bus.

6. The apparatus of claim 1, further comprising means for determining if data is to be transmitted or received over said TDM bus and means for transferring data to said TDM bus from a transmit data register when data is to be transmitted to said TDM bus.

7. The apparatus of claim 1, wherein said data transferring means includes a DMA controller, and wherein said DMA controller reads from source addresses and writes to destination addresses modified by said label.

8. The apparatus of claim 2, wherein said FIFO further comprises a transmit FIFO for storing labels associated with data to be written to said TDM bus and a receive FIFO for storing labels associated with data to be read from said TDM bus.

9. The apparatus of claim 3, wherein said circular register further comprises a transmit circular register for storing labels associated with data to be written to said TDM bus and a receive circular register for storing labels associated with data to be read from said TDM bus.

10. The apparatus of claim 4, wherein said priority encoder further comprises a transmit priority encoder for encoding labels associated with data to be written to said TDM bus and a receive priority encoder for encoding labels associated with data to be read from said TDM bus.

11. The apparatus of claim 2, wherein said FIFO comprises a transmit FIFO and a receive FIFO, and further comprising means for selecting one of said transmit and receive FIFO's for use in a given data transfer.

12. The apparatus of claim 3, wherein said circular register includes a transmit circular register and a receive circular register, and further comprising means for selecting one of said transmit and receive circular register for use in a given data transfer.

13. The apparatus of claim 4, wherein said priority encoder includes a transmit priority encoder and a receive priority encoder, and further comprising means for selecting one of said transmit and receive priority encoder for use in a given data transfer.

14. An apparatus for transferring information over a TDM bus, comprising:
identifying means for identifying a predetermined frame address designated for transferring data;
counting means for identifying a predetermined time slot within a frame identified by said frame address by counting the time slots within said frame; and
label generating means for generating an unique label word associated with said predetermined frame and predetermined time slot, said label being indicative of a register holding data to be transferred to or designated for receipt of data from said TDM bus.

15. The apparatus of claim 14, further comprising selecting means responsive to said label generating means for selecting a register associated with said label and for moving data in said register to said TDM bus.

16. The apparatus of claim 14, further comprising selecting means responsive to said label generating means for selecting a register associated with said label and for moving data from said TDM bus to said register.

17. The apparatus of claim 14, further including a FIFO for storing said label.

18. The apparatus of claim 14, further including a circular register for storing said label.

19. The apparatus of claim 14, further including a priority encoder for storing said label.

20. The apparatus of claim 15, further comprising a transmit FIFO for storing said label, and wherein said selecting means removes said label from said transmit FIFO.

21. The apparatus of claim 15, further comprising a transmit circular register for storing said label, and wherein said selecting means removes said label from said transmit circular register.

22. The apparatus of claim 15, further comprising a transmit priority encoder for encoding said label, and wherein said selecting means removes said label from said transmit priority encoder.

23. The apparatus of claim 16, further comprising a receive FIFO for storing said label, and wherein said selecting means removes said label from said receive FIFO.

24. The apparatus of claim 16, further comprising a receive circular register for storing said label, and wherein said selecting means removes said label from said receive circular register.

25. The apparatus of claim 16, further comprising a receive priority encoder for encoding said label, and wherein said selecting means removes said label from said receive priority encoder.

26. The apparatus of claim 14, further comprising:
a transmit FIFO for storing labels associated with data to be transmitted to said TDM bus;
a receive FIFO for storing labels associated with data received from said TDM bus; and
means for determining whether data is to be transmitted to said TDM bus or received from said TDM bus and for selecting one of said FIFO's accordingly for retrieval of said label.

27. The apparatus of claim 14, further comprising:
a transmit circular register for storing labels associated with data to be transmitted to said TDM bus;
a receive circular register for storing labels associated with data received from said TDM bus; and
means for determining whether data is to be transmitted to said TDM bus or received from said TDM bus and for selecting one of said circular register accordingly for retrieval of said label.

28. The apparatus of claim 14, further comprising:
a transmit priority encoder for encoding labels associated with data to be transmitted to said TDM bus;
a receive priority encoder for encoding labels associated with data received from said TDM bus; and
means for determining whether data is to be transmitted to said TDM bus or received from said TDM bus and for selecting one of said priority encoders according to said label.

29. A method of transferring data over a TDM bus, comprising the steps of:
receiving a current frame address for a current frame over said TDM bus;
counting time slots of said current frame to determine a current time slot number;
comparing said current frame address and said current time slot number with a stored frame address and a stored time slot number and generating a label word if a match is found, said label word being indicative of a storage location for data to be transferred; and storing said label word in a FIFO to allow ordered retrieval of said label word.

30. The method of claim 29, further comprising the steps of:

retrieving said label word from said FIFO; and transferring data between said TDM bus and a register associated with the label word retrieved from said FIFO.

31. A method of transferring data over a TDM bus, comprising the steps of:

receiving a current frame address for a current frame over said TDM bus;

counting time slots of said current frame to determine a current time slot number;

comparing said current frame address and said current time slot number with a stored frame address and a stored time slot number and generating a label word if a match is found, said label word being indicative of a storage location for data to be transferred; and storing said label word in a circular register to allow ordered retrieval of said label word.

32. The method of claim 31, further comprising the steps of:

retrieving said label word from said circular register; and transferring data between said TDM bus and a register associated with the label word retrieved from said circular register.

33. A method of transferring data over a TDM bus, comprising the steps of:

receiving a current frame address for a current frame over said TDM bus;

counting time slots of said current frame to determine a current time slot number;

comparing said current frame address and said current time slot number with a stored frame address and a stored time slot number and generating a label word if a match is found, said label word being indicative of a storage location for data to be transferred; and storing said label word in a priority encoder to allow ordered retrieval of said label word.

34. The method of claim 33, further comprising the steps of:

retrieving said label word from said priority encoder; and transferring data between said TDM bus and a register associated with the label word retrieved from said priority encoder.

35. a method of finding a predetermined time slot in a predetermined frame on a TDM bus having frames and time slots arranged in a master frame, comprising the steps of:

(a) reading a frame address in a designated time slot on said TDM bus;

(b) resetting a counter to an initial state upon receipt of said frame address;

(c) storing said frame address in a register;

(d) comparing said stored frame address with a stored designated frame address;

(e) in said counter, counting the number of time slots following said frame address;

(f) comparing each of said time slots with a stored designated time slot;

(g) determining that a match has occurred in both steps (d) and (f); and (h) generating a label indicative of a register for use in transferring data to or from said TDM bus, said label being unique to the stored frame address and time slot.

36. The method of claim 35, further comprising the step of transferring data to or from said register.

37. The method of claim 35, further comprising the step of storing said label in a FIFO.

38. The method of claim 35, further comprising the step of storing said label in a circular register.

39. The method of claim 35, further comprising the step of storing said label in a priority encoder.

* * * * *